United States Patent
Ambaljeri et al.

(10) Patent No.: US 12,386,633 B2
(45) Date of Patent: Aug. 12, 2025

(54) SYSTEM AND METHOD FOR MANAGING AUTOMATIC SERVICE REQUESTS FOR SCALING NODES IN A CLIENT ENVIRONMENT

(71) Applicant: Dell Products L.P., Round Rock, TX (US)

(72) Inventors: Mahantesh Ambaljeri, Bangalore (IN); Shelesh Chopra, Bangalore (IN); Gururaj Kulkarni, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 230 days.

(21) Appl. No.: 18/324,220

(22) Filed: May 26, 2023

(65) Prior Publication Data

US 2024/0394068 A1 Nov. 28, 2024

(51) Int. Cl.
- G06F 9/445 (2018.01)
- G06F 21/62 (2013.01)
- H04L 41/08 (2022.01)

(52) U.S. Cl.
CPC ...... G06F 9/44505 (2013.01); G06F 21/6218 (2013.01); H04L 41/08 (2013.01)

(58) Field of Classification Search
CPC ......... H04L 41/08; H04L 41/16; H04L 41/14; G06F 9/44505; G06F 21/6218; G06F 11/1446; G06F 11/3006; G06F 2201/815; G06F 2201/84
See application file for complete search history.

(56) References Cited

U.S. PATENT DOCUMENTS

| | | | |
|---|---|---|---|
| 8,954,574 B1 * | 2/2015 | Chheda | H04L 41/0859 709/224 |
| 2017/0126792 A1 * | 5/2017 | Halpern | H04L 41/0894 |
| 2020/0004590 A1 * | 1/2020 | Tang | G06F 9/5005 |
| 2020/0119988 A1 * | 4/2020 | Castellanos | G06F 9/44505 |
| 2021/0081246 A1 * | 3/2021 | Rajadurai | G06F 9/5016 |
| 2021/0232461 A1 * | 7/2021 | Calmon | G06F 11/1464 |
| 2022/0300385 A1 * | 9/2022 | Hermanowski | G06F 11/2028 |
| 2024/0202078 A1 * | 6/2024 | Ur Rahman | G06N 20/00 |

* cited by examiner

*Primary Examiner* — Schquita D Goodwin
*Assistant Examiner* — Joseph M Cousins
(74) *Attorney, Agent, or Firm* — Chamberlain, Hrdlicka, White, Williams & Aughtry; Aly Z. Dossa

(57) ABSTRACT

A method for managing a client environment includes obtaining a notification for an auto-generated service request, wherein the auto-generated service request is associated with a configuration of nodes in the client environment, in response to the notification: obtaining metadata associated with the auto-generated service request, analyzing the metadata to extract current node configuration details, comparing the current node configuration details to an node optimization model, making a determination, based on the comparing, that an optimization is required, based on the determination, performing a re-configuration on the nodes in the client environment.

16 Claims, 8 Drawing Sheets

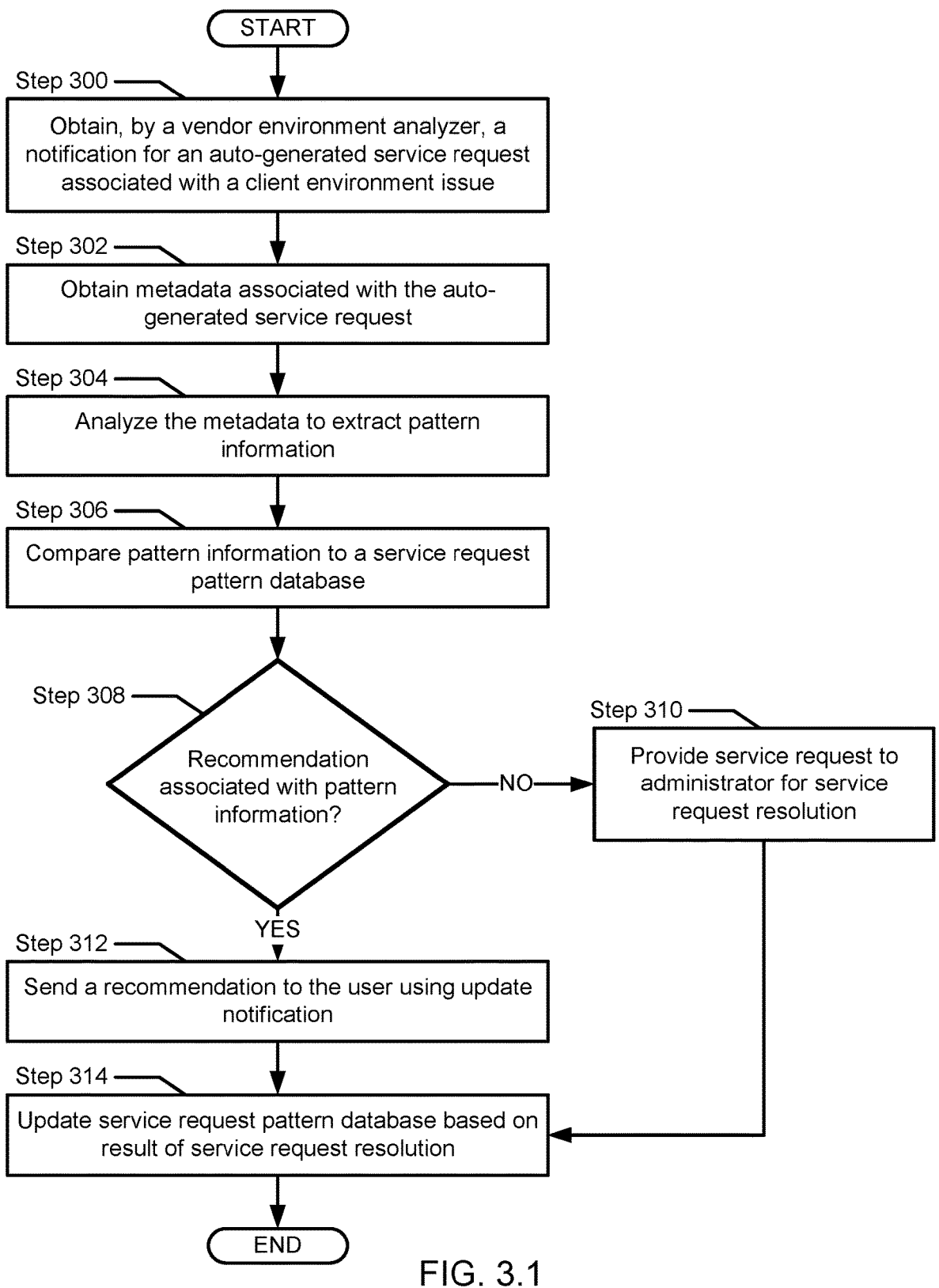
FIG. 3.1

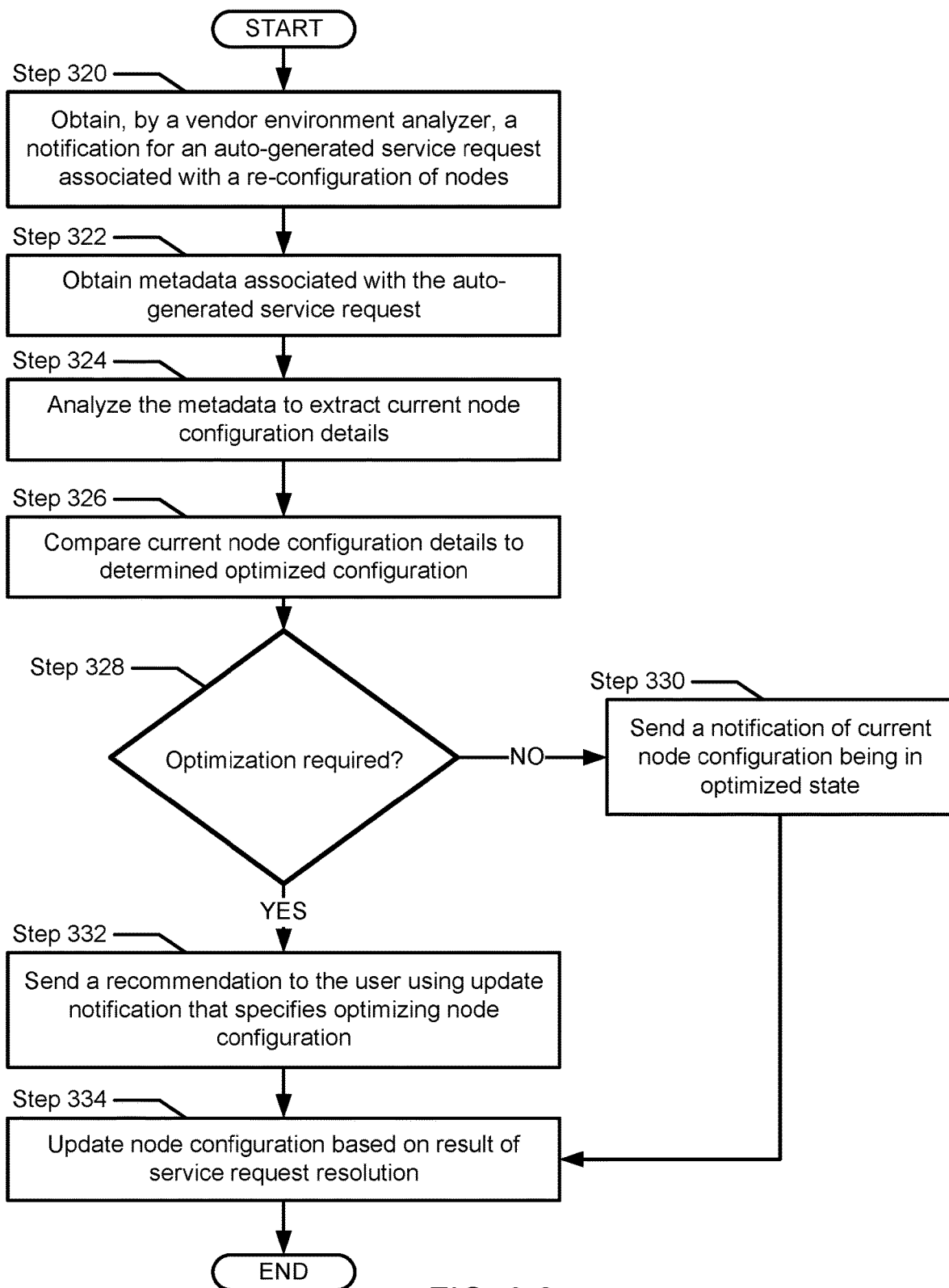
FIG. 3.2

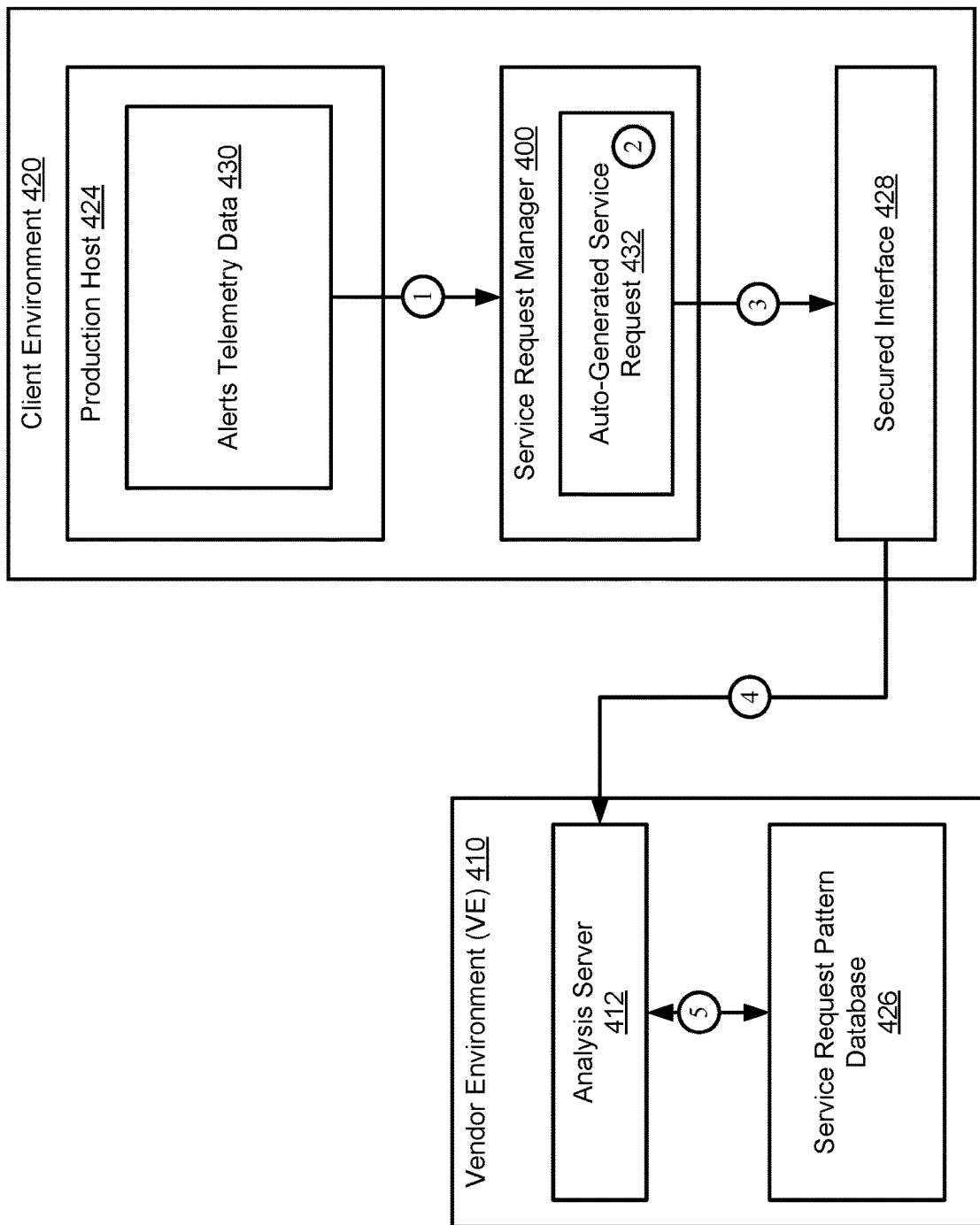
FIG. 4.1

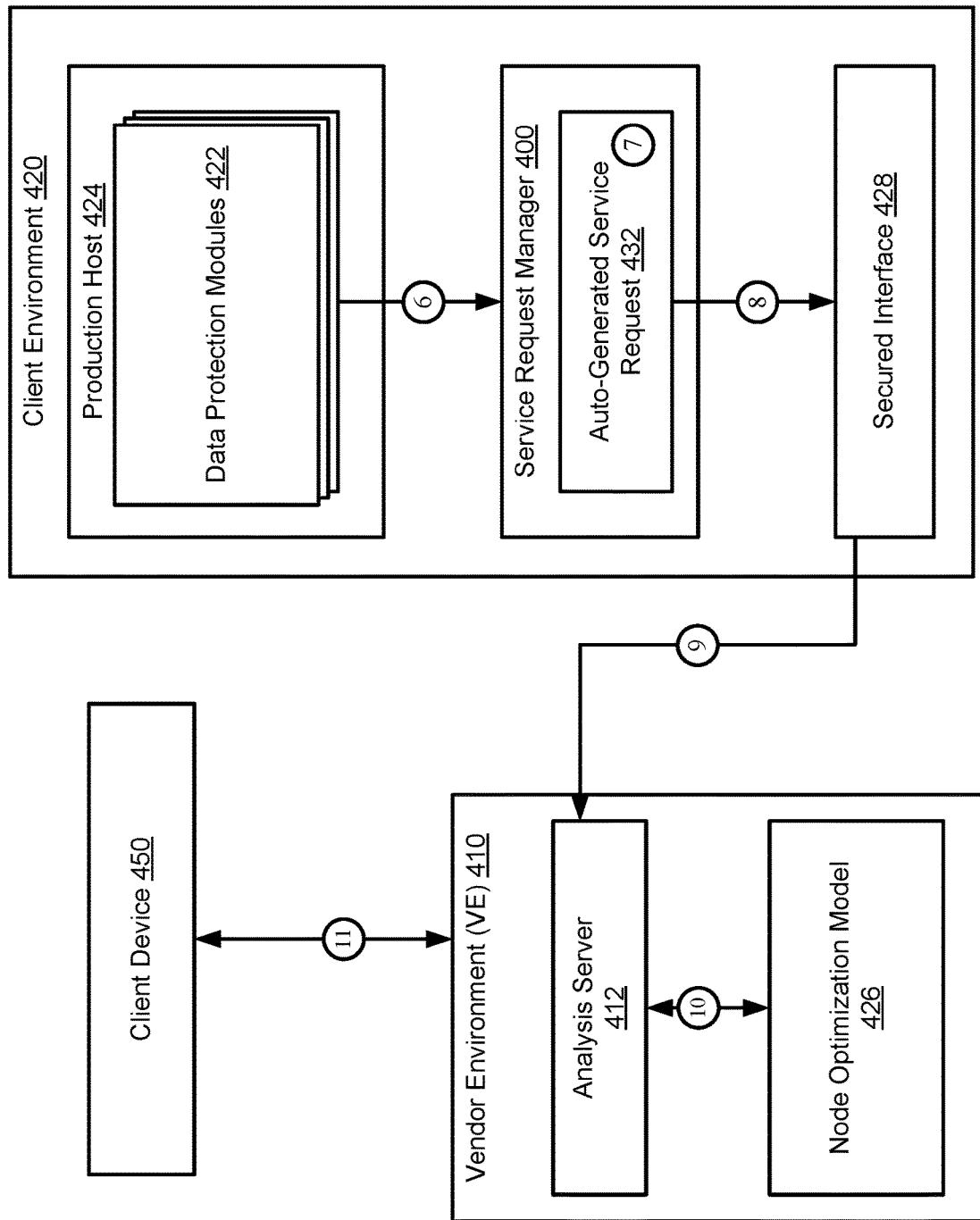
FIG. 4.2

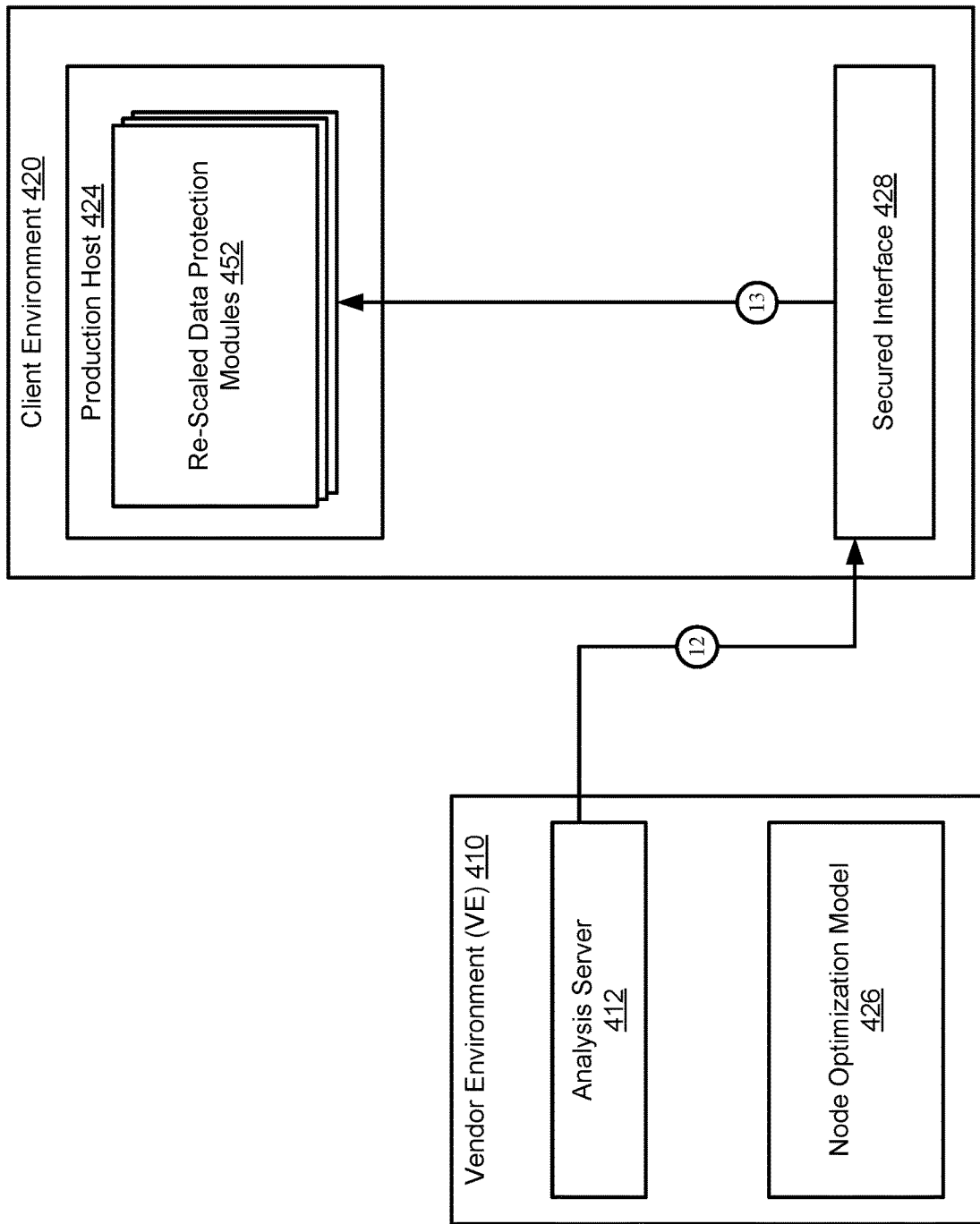
FIG. 4.3

SYSTEM AND METHOD FOR MANAGING AUTOMATIC SERVICE REQUESTS FOR SCALING NODES IN A CLIENT ENVIRONMENT

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 3.1 shows a method for managing service requests generated for fixing a customer environment in accordance with one or more embodiments of the invention.

FIG. 3.2 shows a method for managing service requests generated for scaling nodes in a customer environment in accordance with one or more embodiments of the invention.

FIGS. 4.1-4.3 show example use cases in accordance with one or more embodiments of the invention.

DETAILED DESCRIPTION

Figure 1:
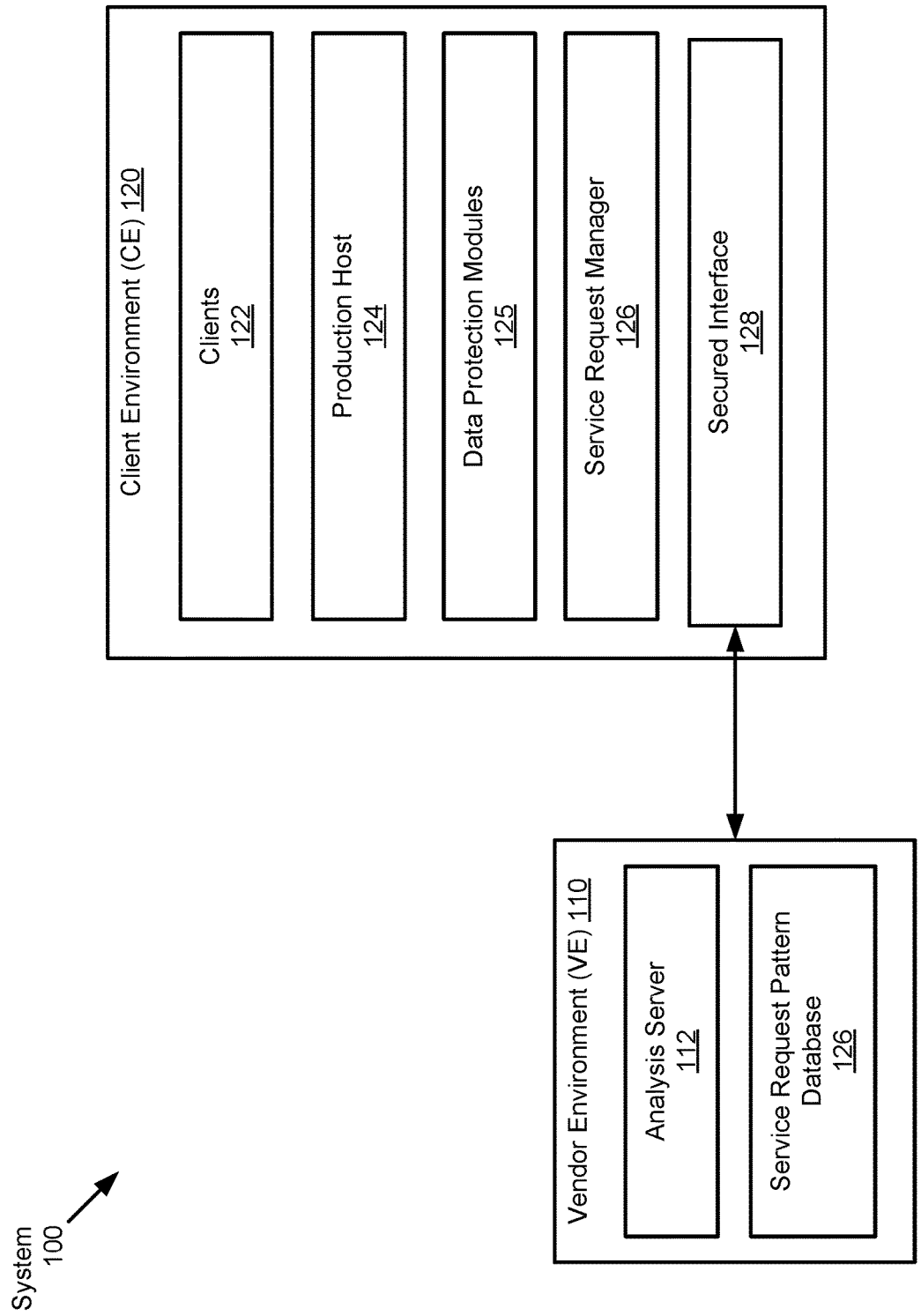
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments of the invention relate to a method and system for managing logical devices. Specifically, embodiments relate to methods and systems for managing the servicing of service requests associated with alerts and/or with the scaling of a system. Embodiments disclosed herein utilize the functionality of the available update notifications to provide recommendations for servicing automatically generated service requests. The automatically generated service requests (also referred to as auto-SRs) may be generated based on a monitoring performed on the system. To reduce the life cycle (e.g., from generation to completion of servicing) of a service request, an analysis server is used that performs an analysis of obtained service requests and obtained recommendation(s) provided services the service requests directly on the customer environment based on the approval of an administrator of the customer environment before the update associated with the update notification is completed.

Embodiments disclosed herein include identifying the physical entities of backend resources and workflows, features, etc. running in particular client environment, relying on telemetry data fetched continuously and storing it in local centralized telemetry analysis database dashboard, and comparing and evaluating the obtained telemetry with similar data captured from internal customer test bed.

Embodiments disclosed herein include using alerts data from backend telemetry that provides a summary for different types of alerts being generated on various client configurations by one or more client environment instances. This data has lot of potential to generate various insights that would help to avoid catastrophic events by proactively addressing them. Alerts are generated for various type of data protection and/or management operations.

Examples of the types of alerts generated include, but are not limited to: asset discovery, copy discovery, server disaster recovery, protection policy, protection copy, compliance, replication, and system events. These alerts can be mainly classified as: critical, warning, and informational.

Embodiments disclosed herein include a solution that would periodically capture, parse and analyze the alerts for all system customers and identify the tolerance level. If the tolerance level is above a threshold value, an auto-SR is generated, and the client is notified with the update notification configured in the system server.

The following describes various embodiments of the invention.

FIG. 1 shows a diagram of a system (100) in accordance with one or more embodiments of the invention. The system (100) includes any number of clients (122), any number of production hosts (e.g., 124), any number of data protection modules (125), a service request manager (126), a secured interface (128), an analysis server (112), and a service request pattern database (114). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the clients (122), the production host (124), the data protection modules (125), the service request manager (126), the secured interface (128), the Analysis server (112), and the service request pattern database (114) may be physical or logical devices, as discussed below. In one or more embodiments, the clients (122), the production host (124), the data protection modules (125), the service request manager (126), and the secured interface (128) may collectively be referred to as "components of a CE (120)". Similarly, in one or more embodiments, the analysis server (112) and the service request pattern database (114) may collectively be referred to as "components of a VE (110)".

While FIG. 1 shows a specific configuration of the system (100), other configurations may be used without departing from the scope of the invention. For example, although the CE (120) and the VE (110) are shown to be directly connected, the CE (120) and the VE (110) may be operatively connected through a communication network (e.g., the secured interface (128)). As yet another example, although the secured interface (128) is shown as part of the CE (120), the secured interface (128) may be operatively connected to the CE (120) (e.g., the secured interface (128) may be implemented separately in the form of hardware, software, or any combination thereof).

Further, the functioning of the secured interface (128), the data protection modules (125), and the analysis server (112) is not dependent upon the functioning and/or existence of the other components (e.g., devices) in the system (100). Rather, the secured interface (128), the data protection modules (125), and the analysis server (112) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job.

As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may deliver computing power, storage capacity, and data protection (e.g., software-defined data protection) as a service to users of the clients (122). The system (100) may also represent a comprehensive middleware layer executing on computing devices (e.g., 500, FIG. 5) that supports virtualized application environments. In one or more embodiments, the system (100) may support one or more virtual machine (VM) environments (e.g., the production host (124)), and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, as being implemented as a physical computing device or a logical computing device, a CE data protection system (not shown, but includes at least the data protection modules (125) and the service request manager (126)) may include functionality to, e.g.: (i) provide software-defined data protection, (ii) provide automated data discovery, protection, management, and recovery operations in on-premises, (iii) provide data deduplication, (iv) orchestrate data protection (e.g., centralized data protection, self-service data protection, etc.) through one or more GUIs of the data protection modules (125), (v) empower data owners (e.g., users of the clients (122)) to perform self-service data backup and restore operations from their native applications, (vi) ensure compliance and satisfy different types of SLOs. (vii) enable virtualized and cloud deployments, including automated data discovery, protection, management, and recovery operations for in-cloud workloads, (viii) enable data discovery, protection, management, and recovery operations for cloud-native workloads (e.g., an application that was designed to reside in a cloud environment) across multiple cloud environments, (ix) simplify VM image backups of a VM with near-zero impact on the VM, (x) streamline data protection for applications and/or containers (e.g., Kubernetes® containers), (xi) increase resiliency of an organization by enabling rapid recovery or cloud disaster recovery (DR) from cyber incidents, (xii) provide long-term data retention, (xiii) provide dynamic network-attached storage (NAS) backup and recovery, and (xiv) provide operational simplicity, agility, and flexibility for physical, virtual, and cloud-native IT environments. One of ordinary skill will appreciate that the CE data protection system may perform other functionalities without departing from the scope of the invention.

In one or more embodiments, a GUI may be displayed on a display of a computing device (e.g., 500, FIG. 5) using functionalities of a display engine (not shown), in which the display engine is operatively connected to the computing device. The display engine may be implemented using hardware, software, or any combination thereof. The GUI may be displayed in any visual format that would allow the corresponding user to easily comprehend (e.g., read and parse) the listed information.

As used herein, the term "backup" is intended to be broad in scope. In this manner, example backups in connection with which embodiments of the invention may be employed include (but not limited to): full backups, partial backups, clones, snapshots, incremental backups, differential backups, etc.

As used herein, "data retention" is a period of time, with a definite start and end, within which the data should be retained in storage (e.g., storage of the CE (120) or simply "CE storage"). For example, a set of user requirements and/or technical considerations (e.g., security considerations, performance considerations, etc.) of a data center may be used to generate a data retention policy specifying that user data should be retained in the storage for six years.

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a NAS, a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, an "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic as to which particular target devices are used, as long as the user performance requirements are satisfied.

In one or more embodiments, data protection policies used to protect massive amounts of data may require a certain level of intelligence to infer SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

In one or more embodiments, the wrong (or sub-optimal) selection of a target device may (i) result in generating an over-utilized or under-utilized target device and (ii) unnecessarily delay a backup (or replication) operation window (discussed below).

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the portion of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualizes the OS, so the container includes only the application (and its libraries and dependencies). The absence of the guest OS makes a container lightweight, fast, and portable.

Further, comparing to a conventional data center scenario, in which (i) all the necessary hardware and software components are needed to be acquired and (ii) an entire infrastructure team is needed to build and configure all aspects of the infrastructure (which may take weeks), the above process may take only minutes with containers. Containers may also include functionality to: (i) perform DR (with this functionality, even if multiple containers fail, applications may continue to execute uninterrupted), (ii) perform seamless scaling up and down with little to no intervention on the part of a user (with this functionality, as demand grows, containers may eliminate the need to add more servers or allocate more resources in a costly way), and (iii) reduce labor-intensive efforts and costs, in which containers may require very few personnel to manage and monitor applications and instances. One of ordinary skill will appreciate that containers may perform other functionalities without departing from the scope of the invention.

As used herein, a "file system" is a method that an OS (e.g., Microsoft® Windows, Apple® MacOS, etc.) uses to control how data is named, stored, and retrieved. For example, once a user has logged into a computing device (e.g., 500, FIG. 5), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

As used herein, a "cloud" refers to servers that are accessed over the Internet (and the software and databases that executes on those servers). With the help of cloud (or "cloud computing"), users or organizations do not need to manage physical servers themselves or execute software application on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

Cloud computing is possible because of a technology called "virtualization". Virtualization allows for the generation of a VM that behaves as if it was a physical computing device with its own hardware components. When properly implemented, VMs on the same host are sandboxed from one another so that they do not interact with each other, and the files and/or applications from one VM are not visible to another VM even though they are on the same physical computing device.

In one or more embodiments, cloud computing environments (which may or may not be public) may include storage environments that may provide data protection functionality for one or more users. Cloud computing environments may also perform computer-implemented services (e.g., data protection, data processing, etc.) on behalf of one or more users. Some example cloud computing environments in connection with which embodiments of the invention may be employed include (but not limited to): Microsoft® Azure, Amazon® AWS, Dell® Cloud Storage Services, Google® Cloud, etc.

In one or more embodiments, as described above, the CE data protection system (not shown) may include the data protection modules (125) and the Service request manager (126).

In one or more embodiments, the data protection modules (125) may provide data protection (e.g., data backup, data management, data restore, etc.) services to the production host (124) (or any other component of the system (100)). The data protection services may initiate (e.g., instantiate, execute, etc.) generation and storage of backups (e.g., block-based backups, file-based backups, etc.) in the CE storage. The data protection services may also include restoration of the production host (124) (or any other component of the system (100)) to a restoration host (not shown) using the backups stored (temporarily or permanently) in the CE storage.

More specifically, the data protection modules (125) may provide data protection services to the production host (124) (or any other component of the system (100)) by orchestrating (or scheduling): (i) generation of backups of the production host (124), (ii) storage of the generated backups of the production host (124) in the CE storage, (iii) consolidation of one or more backup requests to reduce (or to prevent) generation of backups that are not useful for restoration purposes, and (iv) restoration of the production host (124) to previous states using backups stored in the CE storage.

Further, to provide the aforementioned services, the data protection modules (125) may include functionality to generate and issue instructions to any other component of the system (100). The data protection modules (125) may also generate instructions in response to data protection requests from other entities.

In one or more embodiments, the data protection modules (125) may generate such instructions in accordance with data protection schedules that specify when a protection needs to be performed. In one or more embodiments, a data protection schedule may lay out specific points in time for a protection to be performed. A data protection schedule may be configured based on a user's RPO.

As used herein, a "user's RPO" is the time between a data loss event and a most recent backup. For example, if a user has a 4-hour RPO for an application, then the maximum gap between a data loss event and the most recent backup will be 4-hours. In most cases, having a 4-hour RPO may not necessarily mean that a corresponding user will lose 4 hours' worth of data. For example, consider a scenario in which a word processing application goes down at 12:35 a.m. and restored by 1:10 a.m. In this scenario, the user may not have much data to lose.

As yet another example, consider a scenario in which a security application goes down at 10:05 a.m. and could not be restored until 1:25 p.m. In this scenario, the user may lose data that is highly valuable to the user. For this reason, the user may set an RPO based on the application priority and may configure the backup schedules accordingly.

In one or more embodiments, the data protection modules (125) may provide one or more computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more SLAs configured by users of the clients (122)).

In one or more embodiments, while performing one or more operations requested by a user (or an administrator) of the clients (122), the data protection modules (125) may include functionality to request and use resources (e.g., data, computing resources, etc.) available in the CE data protection system. Additional details about the resources (e.g., processing resources, networking resources, etc.) are described below. In one or more embodiments, the administrator may be a user with permission to make changes on the clients (122) that will affect other users of the clients (122).

In one or more embodiments, in order to provide the above-mentioned functionalities, the data protection modules (125) may need to communicate with other components of the system (100) (e.g., the production host (124), the service request manager (126), etc.) with minimum amount of latency (e.g., with high-throughput (e.g., a high data transfer rate) and sub-millisecond latency). For this reason, representational state transfer application programming interfaces (REST APIs) may be used to enable communication between the data protection modules (125) and the components. As used herein, a "REST API" is an interface that two computing devices use to exchange data securely over the Internet (or to exchange data internally). More specifically, the term "REST" defines a set of rules and constraints (not a protocol or a standard) that need to be followed when building a communication path(s). Any computing device that adheres to those rules and constraints will be able to communicate via a set of uniform, shared, and stateless (or stateful) operators and requests. APIs denote the underlying code that, if it conforms to the set of rules and constraints, allows computing devices to communicate with one another.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate a computing device's connection (e.g., access) to one another. In general, the computing device performing the accessing is called "the client", and the computing device containing a resource is called "the server".

In operation, REST APIs use Hypertext Transfer Protocol (HTTP) to communicate. More specifically, REST APIs communicate via HTTP to perform standard database functions such as, for example, creating, reading, updating, and deleting records within a resource. For example, a well-designed REST API is similar to a webpage executing on a web browser with built-in HTTP functionality.

As used herein, "HTTP" is a request/response protocol that is used in cases in which a synchronous request/response is required. This means that computing devices making requests via REST APIs must be designed to expect an immediate response. If the client receiving the response is down, the sending service may be blocked while it awaits for the response. To prevent this, failover and error handling logic may be applied to (or built into) both applications.

In one or more embodiments, similar to the communication between the clients (122) and the production host (124), the clients (122) may also send a request (e.g., a data protection request) to one or more of the data protection modules (125), and in return, the clients (122) may receive a response (e.g., a response that specifies completion of a database backup in a storage) from the corresponding data protection module. One of ordinary skill will appreciate that the data protection modules (125) may perform other functionalities without departing from the scope of the invention.

In one or more embodiments, the data protection modules (125) may support various types of protection targets, depending on the particular use case(s) involved. Such protection targets generally refer to systems, devices, and other computing entities capable of storing data (e.g., backup data). These may be referred to as "protection targets" because they afford protection of data by storing, for example, a copy or clone of that data. In one or more embodiments, protection targets may include, for example (but not limited to): Dell® EMC Data Domain devices (including both physical and virtual devices), Flash storage, private cloud object storage (e.g., Amazon® S3).

In one or more embodiments, each of the example protection targets noted above may have different respective SLAs, performance parameters, latency, and cost. For this reason, if users have specific SLAs for data protection purposes, development of static policies that statically associate protection targets with data protection workloads requires careful evaluation to satisfy the SLA and could adversely impact the ability of satisfying these SLAs if not properly designed.

Further, for example, if a user has various different workload types with different respective SLA requirements, the user may not simply generate a data protection policy and then associate an SLA to these policies, leaving it to a data protection module to automatically select a protection target depending on the SLA. Rather, the protection target selection is a time and labor-intensive manual process that requires a careful designing of a backup infrastructure before assigning one or more protection targets.

Figure 5:
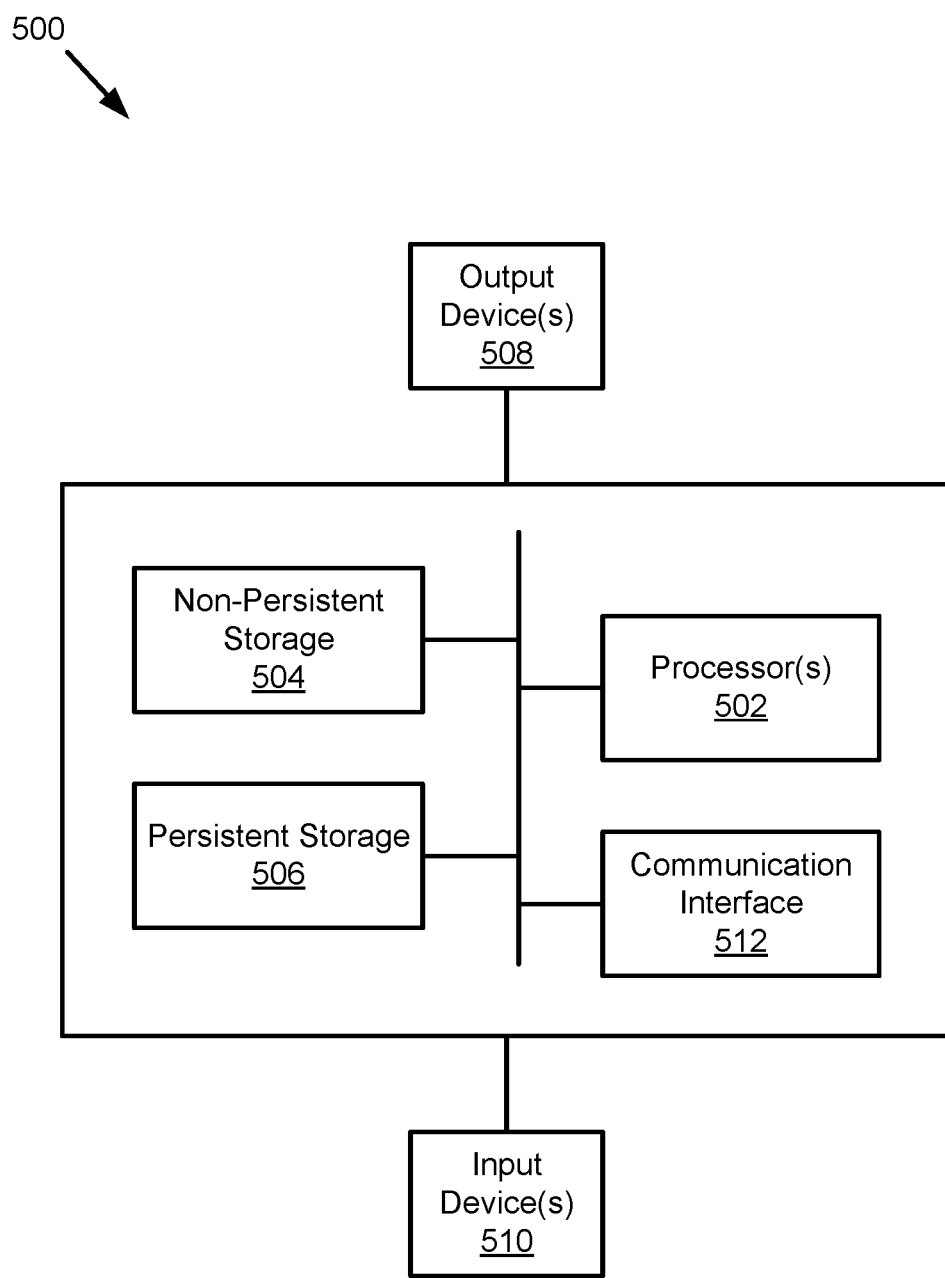
FIG. 5 shows a diagram of a computing device in accordance with one or more embodiments of the invention.

In one or more embodiments, the data protection modules (125) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device cause the computing device to perform the functionality of the data protection modules (125) described throughout the application.

Alternatively, in one or more embodiments, the data protection modules (125) may be implemented as logical devices. The logical devices may utilize the computing resources of any number of computing devices to provide the functionality of the data protection modules (125) described throughout the application.

In one or more embodiments, the service request manager (126) includes functionality for obtaining telemetry data from other components of the CE (120) such as the production host (124), the clients (122), and/or the data protection modules (125) and determining whether a service request is to be generated. The service request may be generated without the initiation of a user (e.g., via a client). The telemetry data may be generated by the service request manager (126) based on performance metrics, detected issues in the CE (120), or based on any other factor without departing from the invention.

In one or more embodiments, the service request manager (126) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device cause the computing device to perform the functionality of the service request manager (126) described throughout the application.

Alternatively, in one or more embodiments, the service request manager (126) may be implemented as a logical device. The logical device may utilize the computing resources of any number of computing devices to provide the functionality of the service request manager (126) described throughout the application.

In one or more embodiments, the service request manager (126) may be implemented using physical devices that provide data storage services (e.g., storing data and providing copies of previously stored data). The devices that provide data storage services may include hardware devices and/or logical devices. For example, the Service request manager (126) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the service request manager (126) may include a memory device (e.g., a dual in-line memory device), in which data is stored and from which copies of previously stored data are provided. As yet another example, the Service request manager (126) may include a persistent storage device (e.g., an SSD), in which data is stored and from which copies of previously stored data is provided. As yet another example, the service request manager (126) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the service request manager (126) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the service request manager (126) may store/log/record (temporarily or permanently) unstructured and/or structured data that may include (or specify), for example (but not limited to): an index of an asset (e.g., a file, a folder, etc.), a backup history documentation of a workload, a restore history documentation of a workload, a documentation that indicates a set of jobs (e.g., a data backup job, a data restore job, etc.) that has been generated, a documentation that indicates a status of a job (e.g., how many jobs are still active, how many jobs are completed, etc.), a set of SLAs (e.g., an agreement that indicates a period of time required to retain backup data), recently obtained user information (e.g., records, credentials, etc.), a cumulative history of initiated data backup operations (e.g., sessions) over a prolonged period of time, a cumulative history of initiated data restoration operations over a prolonged period of time, one or more policies/rules for the operation (or configuration) of any portion of the secured interface (128) (to manage functions/operations performed by the secured interface (128)), a data protection policy (e.g., an SLA, an affinity-based backup policy, a data protection policy that dictates 30 days retention at storage, etc.) implemented by a user of a data protection module (for example, to protect the production host (124), to perform a rapid recovery, etc.), a configuration setting of that policy, a number of each type of a set of data protection policies implemented by a user of a data protection module, a utilization map that specifies resource (e.g., a search node, a reporting node, a NAS node, etc.) utilization levels of a data protection module (e.g., a quantity of utilization, resource utilization rates over time, power consumption of a data protection module while utilized by a client, production workloads performed (for a client) using a data protection module, etc.) per user session and/or per process, recently obtained user activity records, a cumulative history of user activity records obtained over a prolonged period of time, one or more details of an initiated data transfer operation from the CE storage to the production host (124), etc.

In one or more embodiments, the unstructured and/or structured data may be updated (automatically) by third party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, the CE storage may include functionality to provide: (i) temporary and/or permanent data storage services (e.g., the CE storage may store backups of the production host (124)) and (ii) copies of previously stored data (e.g., the CE storage may provide copies of previously stored backups of the production host (124)). Said another way, the CE storage may be configured to generate and store backups in itself. The CE storage may also be configured to restore data using the backups.

Further, one or more snapshots (e.g., user-generated snapshots) may be stored and/or retrieved from the CE storage. In one or more embodiments, for example, snapshots may refer to point-in-time copies of user data. For example, Snapshot A may include one or more database objects (discussed below) of user data at a specific point-in-time. As yet another example, Snapshot B may include one or more database objects of the user data at a later point-in-time than the specific point-in-time captured by Snapshot A. One of ordinary skill will appreciate that the CE storage may perform other functionalities without departing from the scope of the invention.

In one or more embodiments, the data protection modules (125) may obtain a status of a data protection operation from the CE storage. The status of the operation may specify information such as: (i) whether the operation was successful and whether the operation was completed within a predetermined window (e.g., 100% of the operation was completed within the predetermined window), or (ii) whether the operation was unsuccessful and how much of the operation was not completed within the predetermined window (e.g., 70% of the operation was completed and 30% of the operation was not completed). In one or more embodiments, the predetermined window may be a period of time, with a definite start and end, within which a data protection operation is set to be completed.

In one or more embodiments, the CE storage may include an operation monitoring service for monitoring a status of a data protection operation. The operation monitoring service may be a computer program that is executed on the underlying hardware of the CE storage. The operation monitoring service may also be designed and configured to facilitate remote access to check the status of and/or manipulate locally stored data during an operation. Further, the operation monitoring service may include functionality to control remote procedure calls (e.g., API calls) that aims to access and manipulate any granularity of the locally stored data during an operation.

As used herein, an "API call" refers to a process of an application or a computing device submitting a request to an API to retrieve the requested data from an external application or an external computing device.

In one or more embodiments, when an ongoing data protection operation is completed, the CE storage may send a notification (e.g., a confirmation notification) to the corresponding data protection module regarding the completed operation. In one or more embodiments, the notification (e.g., the alert) may indicate whether the operation was completed within the predetermined window, or whether the operation was completed after exceeding the predetermined window. The notification may be displayed on the GUI of the corresponding data protection module. Thereafter, the corresponding data protection module may notify, via a GUI of a client, a requesting entity (e.g., a user who requested the operation) about completion of the operation.

In one or more embodiments, as being a target device (or a data domain), the CE storage may include various types of data, for example (but not limited to): an attribute of an asset, an ACL of an asset, application data, user data, an SLA, a snapshot of a volume, a list of instructions, a setting of an application, a version of an application, a version of an OS, display resolution configuration of a client, a product identifier of an application, an alert (e.g., a predictive alert, a proactive alert, a technical alert, etc.) triggered in a client, an important keyword (e.g., recommended maximum CPU operating temperature is 75° C.) related to a hardware component, an amount of storage used by an application, a language setting of an OS, a serial number of a client, a hardware identification (ID) number of a hardware component, an identifier of a client's manufacturer, a product identifier of a hardware component, media access control (MAC) information of a client, network connectivity information (e.g., a category of a network) of a client, an identifier of a client, a type of a client, a type of a file system, information related to a customer's CPU usage, a recovery catalog, an asset, a control asset, an archive log asset, etc.

In one or more embodiments, a recovery catalog may be a database object that stores metadata of a backup operation (simply "backup metadata"). The recovery catalog may include entries for one or more backup operations. The entries may include backup metadata that specify information regarding successfully backed up assets from previously executed backup operations. For example, backup metadata may include (but not limited to): an identifier of an asset, information associated with a location of an asset, etc.

In one or more embodiments, an asset may be a database object that stores database data, in which it may include a computer-readable content (e.g., text, image, video, audio, machine code, any other form of, or a combination thereof) that may be generated, interpreted, and/or processed by an application.

In one or more embodiments, an asset may store database data in an undeduplicated form or in a deduplicated form. Briefly, a deduplicated form of database data may be generated, via the application, by performing data deduplication on an undeduplicated form of the database data. That is, undeduplicated database data may include computer-readable content that may or may not entail redundant information. In contrast, deduplicated database data may result from the elimination of any redundant information analyzed throughout an undeduplicated computer-readable content.

In one or more embodiments, deduplicated database data may reflect a content recipe of one or more undeduplicated computer-readable contents. A content recipe may be a sequence of chunk identifiers (or pointers) of unique database data chunks consolidated in the CE storage. The sequence of chunk identifiers (as a representative of the deduplicated database data) may be used to reconstruct the corresponding undeduplicated database data. Additionally, a given chunk identifier for a given database data chunk may include a cryptographic fingerprint (or hash) of the given database data chunk.

In one or more embodiments, a control asset may be a database object that stores database metadata, in which the database metadata may include information descriptive of the database's status and structure. For example, database metadata may include (but not limited to): an identifier of a database, an identifier of an asset, information specifying a storage location of an asset, a creation timestamp of an asset, a log sequence number of an archive log file, etc.

In one or more embodiments, an archive log asset may be a database object that stores history of changes made to database data. An archive log asset may include one or more redo entries (or redo records), which may include a set of change vectors. Each change vector may describe (or represent) a modification made to a subset of database data. In one or more embodiments, an archive log asset may serve to recover database data should a failover occur, or to implement recent changes to recovered database data that was recovered during a backup operation.

In one or more embodiments, an alert may specify (or include), for example (but not limited to): a medium-level of CPU overheating is detected, a recommended maximum CPU operating temperature is exceeded, an introduction of a new data protection module (125) to the CE (120), asset discovery, copy discovery, server disaster recovery, compliance, replication, and system events. These alerts can be mainly classified as: critical, warning, and informational. In one or more embodiments, alerts may be defined by a vendor of that client, by the administrator, by another entity, or any combination thereof. The alerts may be defined based on a data protection policy.

In one or more embodiments, important keywords may be defined by a vendor of that client, by the administrator, by another entity, or any combination thereof. The important keywords may be specific technical terms or vendor specific terms that are used in system log files.

In one or more embodiments, the CE storage may include one or more storage or memory resources. A storage or memory resource may refer to a measurable quantity of a storage/memory-relevant resource type, which can be requested, allocated, and consumed. A storage/memory-relevant resource type may encompass a physical device (i.e., hardware), a logical intelligence (i.e., software), or a combination thereof, which may provide temporary or permanent data storage functionality and/or services. Examples of a storage/memory-relevant resource type may be (but not limited to): an HDD, an SSD, RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, as being a physical computing device or a logical computing device, the production host (124) may be configured for hosting and maintaining various workloads, and/or for providing a computing environment whereon workloads may be implemented. For example, the production host (124) may exchange data with other components of the system (100) in order to, for example, participate in a collaborative workload placement. As yet another example, the production host (124) may split up a request (e.g., an operation, a task, an activity, etc.) with another component, coordinating its efforts to complete the request (e.g., to generate a response) more efficiently than if the production host (124) had been responsible for completing the request. One of ordinary skill will appreciate that the production host (124) may perform other functionalities without departing from the scope of the invention.

In one or more embodiments, the production host (124) may host any number of applications (and/or content accessible through the applications) that provide application services to the clients (122). Application services may include, for example (but not limited to): database services, electronic communication services, instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide application services, each application may host similar or different components. The components may be, for example (but not limited to): instances of databases, instances of email servers, etc.

Further, applications may vary in different embodiments, but in certain embodiments, applications may be custom developed or commercial (e.g., off-the-shelf) applications that a user desires to execute in the production host (124). In one or more embodiments, applications may be logical entities executed using computing resources of the production host (124). For example, applications may be implemented as computer instructions, e.g., computer code, stored on persistent storage of the production host (124) that when executed by the processor(s) of the production host (124) cause the production host (124) to provide the functionality of the applications described throughout the application.

In one or more embodiments, while performing, for example, one or more operations requested by a user of the clients (122), applications installed on the production host (124) may include functionality to request and use resources (e.g., data, computing resources, etc.) of the production host (124). Applications may also perform other types of functionalities not listed above without departing from the scope of the invention. In one or more embodiments, while providing application services to a user, applications may store (temporarily or permanently) data that may be relevant to the user in the persistent storage or in the CE storage.

In one or more embodiments, the production host (124) may provide computer-implemented services to the clients (122) (and/or other components of the system (100)). The production host (124) may provide any quantity and any type of computer-implemented services (e.g., data storage services, electronic communication services, etc.). To provide computer-implemented services, the production host (124) may include a collection of physical components (e.g., processing resources, storage/memory resources, networking resources, etc.) configured to perform operations of the production host (124) and/or otherwise execute a collection of logical components (e.g., virtualization resources) of the production host (124). A portion of the collection of physical and logical components are described below.

In one or more embodiments, the production host (124) may be capable of providing the aforementioned functionalities/services to users of the clients (122). However, not all of the users may be allowed to receive all of the services. For example, the priority (e.g., the user access level) of a user may be used to determine how to manage computing resources within the production host (124) to provide services to that user. As yet another example, the priority of a user may be used to identify the services that need to be provided to that user. As yet another example, the priority of a user may be used to determine how quickly communications (for the purposes of providing services in cooperation with the network (and its subcomponents)) are to be processed by the network.

Further, consider a scenario where a first user is to be treated as a normal user (e.g., a user with a user access level of 4/10). In such a scenario, the user level of that user may indicate that certain ports (of the production host (124)) are to be opened, other ports are to be blocked so that (i) certain services are to be provided to the user by the production host (124) and (ii) data traffic from that user is to be afforded a normal level of quality (e.g., a normal processing rate). In contrast, a second user may be determined to be a high priority user (e.g., a user with a user access level of 9/10). In such a case, the user level of that user may indicate that more ports are to be opened than were for the first user so that (i) the production host (124) may provide more services to the second user and (ii) data traffic from that user is to be afforded a high level of quality (e.g., a higher processing rate than the traffic from the normal user).

In one or more embodiments, the production host (124) may include any number of VMs that hosts the above-discussed applications. The VMs may be logical entities executed using the physical and logical components of the production host (124), or using computing resources of other computing devices connected to the production host (124). Each of the VMs may perform similar or different processes. In one or more embodiments, the VMs (and applications hosted by the VMs) may generate data (e.g., VM data) that is stored in the persistent storage of the production host (124), in which the VM data may reflect a state of a VM.

In one or more embodiments, VMs may provide services (e.g., application services) to the clients (122). For example, VMs may host instances of databases, email servers, and/or other applications that are accessible to the clients (122). The VMs may host other types of components not listed above without departing from the scope of the invention.

In one or more embodiments, VMs may be implemented as computer instructions, e.g., computer code, stored in the persistent storage that when executed by the processor(s) of the production host (124) cause the production host (124) to provide the functionality of the VMs described throughout the application.

In one or more embodiments, the production host (124) may include a hypervisor. The hypervisor may be configured to orchestrate the operation of the VMs by allocating the physical and logical components to each of the VMs. In one or more embodiments, the hypervisor may be a physical device including circuitry, for example (but not limited to): a field-programmable gate array, an application-specific integrated circuit, a programmable processor, a microcontroller, a digital signal processor, etc. The physical device may be adapted to provide the functionality of the hypervisor described throughout the application. Alternatively, similar to the VMs, the hypervisor may also be implemented as computer instructions.

In one or more embodiments, the production host (124) may also include a production agent, which is configured to locally orchestrate the performance of data protection operations. For example, the production agent may perform a data protection operation under the direction of a data protection module, in which the data protection module sends instructions to the production agent regarding: (i) when one or more operations should be performed, (ii) where the resulting data backup(s) should be stored (temporarily or permanently), and (iii) when a VM should be restored to a previous state. Other instructions not listed above may also be sent without departing from the scope of the invention.

In one or more embodiments, to orchestrate the performance of one or more data operations, the production agent may issue commands to the hypervisor to manage one or more VMs when a backup of those VMs is being performed, or when a restoration of those VMs is being performed.

In one or more embodiments, the production agent may include functionality to: (i) consolidate multiple data protection requests (received from, for example the data protection modules (125)) so that duplicative operations (which may not be useful for restoration purposes) are not generated, and (ii) initiate multiple data protection operations in parallel. For example, the production agent may host multiple operations. Each of the multiple operations may (a)

manage the initiation of a respective operation and (b) operate concurrently to initiate multiple operations. In one or more embodiments, the production agent may be implemented using hardware, software, or any combination thereof.

In one or more embodiments, the production host (124) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the production host (124) described throughout the application.

Alternatively, in one or more embodiments, similar to the data protection modules (125), the production host (124) may also be implemented as a logical device.

In one or more embodiments, the clients (122) may be physical or logical computing devices configured for hosting one or more workloads, or for providing a computing environment whereon workloads may be implemented. The clients (122) may correspond to computing devices that one or more users use to interact with one or more components of the system (100).

In one or more embodiments, a client may include any number of applications (and/or content accessible through the applications) that provide computer-implemented application services to a user. Applications may be designed and configured to perform one or more functions instantiated by a user of the clients (122). Examples of an application may include (but not limited to): a word processor, a media player, a web browser, a file viewer, an image editor, etc.

In order to provide the above-mentioned application services, each application may host similar or different components. The components may be, for example (but not limited to): instances of databases, instances of email servers, etc. Applications may be executed on one or more clients as instances of the application.

In one or more embodiments, applications may vary in different embodiments, but in certain embodiments, applications may be custom developed or commercial applications that a user desires to execute in a client. In one or more embodiments, applications may be logical entities executed using computing resources of a client. For example, applications may be implemented as computer instructions, e.g., computer code, stored on persistent storage of the client that when executed by the processor(s) of the client cause the client to provide the functionality of the applications described throughout the application.

In one or more embodiments, while performing, for example, one or more operations requested by a user, applications installed on a client may include functionality to request and use physical and logical components of the client. Applications may also include functionality to use data stored in storage/memory resources of the client. The applications may perform other types of functionalities not listed above without departing from the scope of the invention. In one or more embodiments, while providing application services to a user, applications may store data that may be relevant to the user in storage/memory resources of a client.

In one or more embodiments, the clients (122) may interact with the production host (124). For example, the clients (122) may issue requests to the production host (124) to receive responses and interact with various components of the production host (124). The clients (122) may also request data from and/or send data to the production host (124). As yet another example, the clients (122) may utilize application services provided by the production host (124). When the clients (122) interact with the production host (124), data that is relevant to the clients (122) may be stored (temporarily or permanently) in the production host (124).

As yet another example, consider a scenario in which the production host (124) hosts a database utilized by the clients (122). In this scenario, the database may be a client database associated with users of the clients (122). When a new user is identified, the clients (122) may add information of the new user to the client database. By doing so, data that is relevant to the clients (122) may be stored in the production host (124). This may be done because the clients (122) may desire access to the information of the new user at some point-in-time.

As yet another example, a client may execute an application that interacts with an application database hosted by the production host (124). When an application upgrade is available to fix a critical software issue, the production host (124) may identify the client that requires the application upgrade. The application database may then provide the application upgrade to the client. By doing so, the application executed by the client may be kept up-to-date. As yet another example, the clients (122) may send instructions to the production host (124) to configure one or more VMs hosted by the production host (124). In one or more embodiments, instructions may be, for example (but not limited to): instructions to configure a backup policy, instructions to take a snapshot of VM data, etc.

As yet another example, a client may initiate an application to execute on the production host (124) such that the application may (itself) gather, transmit, and/or otherwise manipulate data located in the production host (124), remote to the client. In one or more embodiments, the clients (122) may share access to more than one production host and may similarly share any data located in those hosts.

In one or more embodiments, the clients (122) may provide computer-implemented services to users (and/or other computing devices such as, for example, other clients or other types of components). The clients (122) may provide any quantity and any type of computer-implemented services (e.g., data storage services, electronic communication services, etc.). To provide computer-implemented services, each client may include a collection of physical components (described below) configured to perform operations of the client and/or otherwise execute a collection of logical components (described below) of the client.

In one or more embodiments, a processing resource (not shown) may refer to a measurable quantity of a processing-relevant resource type, which can be requested, allocated, and consumed. A processing-relevant resource type may encompass a physical device, a logical intelligence, or a combination thereof, which may provide processing or computing functionality and/or services. Examples of a processing-relevant resource type may include (but not limited to): a CPU, a graphical processing unit (GPU), a data processing unit (DPU), a computation acceleration resource, application specific integrated circuits (ASICs), a digital signal processor for facilitating high speed communication, etc.

In one or more embodiments, a client may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while the clients (122) provide computer-implemented services to users, the clients (122) may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (122) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface a client with external entities (e.g., other clients, the data protection modules (125), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients. For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

In one or more embodiments, a virtualization resource may include a hypervisor, in which the hypervisor may be configured to orchestrate an operation of, for example, a VM by allocating computing resources of a client to the VM. Details of the hypervisor are described above.

In one or more embodiments, the clients (122) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (122) described throughout the application.

Alternatively, in one or more embodiments, similar to the data protection modules (125), the clients (122) may also be implemented as logical devices.

In one or more embodiments, users may interact with (or operate) the clients (122) in order to perform work-related tasks (e.g., production workloads). In one or more embodiments, the accessibility of users to the clients (122) may depend on a regulation set by an administrator of the clients (122). To this end, each user may have a personalized user account that may, for example, grant access to certain data, applications, and computing resources of the clients (122). This may be realized by implementing the "virtualization" technology (discussed above).

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a GUI generated by a visualization module (not shown) of the client. In one or more embodiments, the visualization module may be implemented in hardware (e.g., circuitry), software, or any combination thereof.

In one or more embodiments, as being a physical computing device or a logical computing device (e.g., a VM), the secured interface (128) may be configured for, at least: (i) transmitting update notifications to the clients (122), (ii) transmitting generated auto-SRs to the vendor environment (110), and (iii) obtaining relevant workload information associated with the CE (120) to be transmitted to the vendor environment (110). One of ordinary skill will appreciate that the secured interface (128) may perform other functionalities without departing from the scope of the invention.

In one or more embodiments, the VE (110) may include, at least, the analysis server (112) and the service request pattern database (114). The snalysis server (112) and the service request pattern database (114) may be physical or logical devices, as discussed below. Although the service request pattern database (114) is shown as part of the VE (110), the service request pattern database (114) may be operatively connected to the VE (110) (e.g., the service request pattern database (114) may be implemented separately in the form of hardware, software, or any combination thereof).

In one or more embodiments, the analysis server (112) of the vendor environment (110) may include functionality for managing the obtained service requests. Examples of the analysis server (112) may include (but not limited to): an enterprise server, a modular server, a blade server, a mainframe, a workstation computer, etc. In one or more embodiments, the analysis server (112) may be a heterogeneous set, including different types of hardware components and/or different types of OSs. In one or more embodiments, the secured interface (128) may be configured to perform all, or a portion, of the functionalities described in FIGS. 3.1-3.2. Additional details about the analysis server are described below in reference to FIG. 2.

As used herein, a "server" may provide computer-implemented services (e.g., receiving a request, sending a response to the request, etc.) to one or more entities (e.g., users, components of the system (100), etc.). In one or more embodiments, the request may be, for example (but not limited to): a web browser search request, a REST request, a computing request, a database management request, etc. To provide the computer-implemented services to the entities, the server may perform computations locally and/or remotely. By doing so, the server may utilize different computing devices (e.g., 500, FIG. 5) that have different quantities of computing resources (e.g., processing cycles, memory, storage, etc.) to provide a consistent experience to the entities.

In one or more embodiments, the VE (110) may include functionality to, e.g.: (i) based on an increased (or decreased) resource-related change in a data protection module, receive (or obtain) relevant data (which is extracted by an analyzer (e.g., 210, FIG. 2) from metadata) from the secured interface (128) over the network (described below), (ii) analyze the aforementioned data in (i) and generate a recommendation (e.g., "please increase the number of NAS nodes deployed to Data Protection Module 5", "please decrease the number of search nodes deployed to Data Protection Module 44", etc.) for the data protection module, (iii) communicate with an agent of the data protection modules (125) while generating a recommendation (in which, for example, (a) the agent checks against the best practices (e.g., to manage protection of 60 VMs, 3 search nodes needs to be deployed to the corresponding data protection module; to manage protection of 60 VMs. 3 proxy nodes needs to be deployed to the corresponding data protection module, etc.) specified in a "best practices (or recommendation) lookup table" and (b) the agent provides related information to the Analysis server (112) so that the Analysis server (112) may generate a suitable recommendation (e.g., a recommended solution) for the data protection module), (iv) communicate with the agent of the Service request pattern database (114) (or with third party systems) to find a fix (or a recommended solution) related to an unhealthy state of the data protection module (e.g., Data Protection Module A is unhealthy because Data Protection Module A does not have enough proxy nodes), (v) based on (ii)-(iv), send the recommendation to the secured interface (128) (in order to, for example, manage a technical support issue (TSI) reported for a data protection module), (vi) based on (ii)-(iv), send the recommendation to the secured interface (128) (in order to, for example, manage the unhealthy status of the data protection module), (vii) store (temporarily or permanently) relevant data (corresponding to a data protection module) received from the secured interface (128), (viii) automatically react and generate a failure report associated with a data protection module including at least a current state of that module (received from the secured interface (128)), an inferred future state of that module (received from the secured interface (128)), relevant data, and a recommendation, (ix) based on (viii), provide the failure report to an administrator of the VE (110) (so that the administrator evaluates the failure report and takes an appropriate action (e.g., initiating level 1, level 2, or level 3 technical support sequence with a user of the corresponding data protection module)), (x) based on the failure report (generated in (viii)), enable an administrator of the VE (110) to manage differences between the administrator's data protection module testing activities and a user's data protection module utilization activities for more pinpoint product management and development, (xi) based on the failure report (generated in (viii)), enable an administrator of the VE (110) to adopt a "shift-left" testing methodology in product management and development, (xii) based on the failure report (generated in (viii)), enable an administrator of the VE (110) to identify a device profile of a data protection module more in-depth in order to provide a better user experience to the corresponding user, (xiii) based on the failure report (generated in (viii)), enable administrators of the VE (110) to invest most of their time and engineering effort to make correct decisions with respect to product investment opportunities, and (xiv) store the above-discussed data and/or the output(s) of the above-discussed processes in the Service request pattern database (114). Additional details of the VE analyzer are described below in reference to FIGS. 3.1 and 3.2.

One of ordinary skill will appreciate that the analysis server (112) may perform other functionalities without departing from the scope of the invention. When providing its functionalities, the analysis server (112) may perform all, or a portion, of the methods illustrated in FIGS. 3.1 and 3.2. The analysis server (112) may be implemented using hardware, software, or any combination thereof. Additional details regarding the analysis server (112) may be found, for example, in FIG. 2.

In one or more embodiments, (i) as being a part of the VE (110) and (ii) as being a physical computing device or a logical computing device, the service request pattern database (114) may provide less, the same, or more functionalities and/or services (described above) than the service request manager (126). In one or more embodiments, the service request pattern database (114) may be a fully managed cloud (or local) database (or any logical container) that acts as a shared storage or memory resource that is functional to store unstructured and/or structured data. Further, the service request pattern database (114) may also occupy a portion of a physical storage/memory device or, alternatively, may span across multiple physical storage/memory devices.

In one or more embodiments of the invention, the service request pattern database (126) includes a mapping between pattern information (generated by the analysis server (112) in accordance with FIG. 3.1) and a recommendation for resolving a service request. In one or more embodiments, the pattern information specifies previous instances of an issue specified in an alert associated with a service request. The pattern information may specify other information without departing from the invention.

In one or more embodiments, the service request pattern database (114) may be implemented using physical devices that provide data storage services. The devices that provide data storage services may include hardware devices and/or logical devices. For example, the Service request pattern database (114) may include any quantity and/or combination of memory devices, long-term storage devices, other types of hardware devices that may provide short-term and/or long-term data storage services, and/or logical storage devices.

For example, the service request pattern database (114) may include a memory device (e.g., a dual in-line memory device), in which data is stored and from which copies of previously stored data are provided. As yet another example, the Service request pattern database (114) may include a persistent storage device (e.g., an SSD), in which data is stored and from which copies of previously stored data is provided. As yet another example, the service request pattern database (114) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the service request pattern database (114) may also be implemented using logical storage. Logical storage may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the service request pattern database (114) may store/log/record (temporarily or permanently) unstructured and/or structured data that may include (or specify), for example (but not limited to): one or more configuration parameters (described below) provided/configured by an administrator of the VE (110), one or more lists that specify which computer-implemented services (delivered by the data protection modules (125)) should be provided to which user (depending on a user access level of a user), one or more policies/rules for the operation (or configuration) of any portion of the analysis server (112) (to manage functions/operations performed by the analysis server (112)), one or more policies/rules for the operation (or configuration) of any portion of a data protection module, details of each data protection module (e.g., how many search nodes deployed to each data protection module, information regarding the criticality of a data protection operation orchestrated by a data protection module, an IP address of each component deployed to a data protection module, active/passive port numbers of each component deployed to a data protection module, a product identifier of each component deployed to a data protection module, applications/software executing on a data protection module, etc.) deployed to the CE (120), a device profile of a healthy data protection module, a device profile of an unhealthy data protection module, one or more outputs of the processes performed by the analysis server (112), one or more outputs of the processes performed by the secured interface (128), a set of SLAs (e.g., an agreement that indicates a period of time required to retain a profile of a user, an agreement that indicates a period of time required to retain a device profile of a data protection module, etc.), recently obtained user information (e.g., records, credentials, etc.) of a user of a data protection module, a port's user guide, a port's release note, a user posted approximated port activation time, a model name of a hardware component, (associated with a data protection module) received from the secured interface (128), data protection module specific information (e.g., data protection module events, periodically obtained temperature data/logs of a data protection module, periodically obtained sensor data/logs of a data protection module (any quantity and types of sensing measurements/data associated with the data protection module over any period(s) of time and/or at any point(s) in time), etc.), other types of information indicative of health of a data protection module, a data protection policy (e.g., an SLA, an affinity-based backup policy, a data protection policy that dictates 30 days retention at storage, etc.) implemented by a user of a data protection module (for example, to protect the production host (124), to perform a rapid recovery, etc.), a configuration setting of that policy, a number of each type of a set of data protection policies implemented by a user of a data protection module, a resource utilization map that specifies resource (e.g., a search node, a reporting node, a NAS node, etc.) utilization of a data protection module (e.g., a quantity of utilization, resource utilization rates over time, power consumption of a data protection module while utilized by a client, production workloads performed using a data protection module for a client, etc.) per user session and/or per process, one or more details (e.g., content of a recommended solution package, information regarding a size of that package, information regarding a targeted destination (e.g., the secured interface (128)), etc.) of a recently generated recommendation, a "best practices lookup table" that shows (a) the mappings between a received TSI and a recommended solution for that TSI and (b) the best practices that a user of a data protection module needs to follow for a better user experience, an inventory of data protection modules that are monitored by the secured interface (128), corresponding details (e.g., an identity of a client, a hardware ID number of a data protection module, a type of an alert, a category of that alert, etc.) of an alert triggered in a data protection module, a cumulative history of recommendations generated for a data protection module over a prolonged period of time, a cumulative history of user activity records obtained over a prolonged period of time, any changes to configuration parameters (as well as the relevant parties and information associated with such changes, in which the changes may be result of changes made by an administrator or via administrative systems), a predetermined maximum threshold (e.g., the best practice recommended by the vendor, such as (i) a single data protection policy should not protect more than 100 assets, (ii) for dynamic NAS, maximum one billion files can be protected per day, (iii) for FSs, maximum 1000 FSs can be protected per day via block-based backup method, etc.), an existing knowledge base (KB) article, a TS history documentation of a data protection module, a community forum question and its associated answer, a user posted approximated port activation time, details of a remediative action that is applied to a previous data protection module failure, a version of a security fix, a version of an application upgrade, a catalog file of an application upgrade, details of a compatible OS version for an application upgrade to be installed, an application upgrade sequence, a solution or a workaround document for a software failure, a language setting of an OS, a serial number of a computing device, etc. Based on the aforementioned data, for example, the Analysis server (112) may perform analytics to infer a device profile (or health status) of a data protection module. Additional details of the metadata are described below in reference to FIG. 2.

In one or more embodiments, the configuration parameters may specify (or include), for example (but not limited to): one or more rules/policies for (a) what data to cache, (b) when to cache the data, (c) for whom to cache the data, and (d) when to expire an object in cache or refresh the cache; one or more rules/policies that are provided based on (i) a profile of a user, (ii) a device profile of a data protection module, (iii) a type of a network connection, (iv) a type of storage, and (v) contents/payloads (e.g., a recommended solution package (or a recommendation)) of network traffic (towards to the secured interface (128)); etc.

In one or more embodiments, the service request pattern database (114) may provide an indexing service. An index may include, for example (but not limited to): pattern information about a service request type, a keyword extracted from a data recovery operation that relates to a type of the recovery (e.g., cloud DR, rapid recovery, etc.), an alert associated with a data protection operation, etc. The index(es) may also include other information that may be used to efficiently identify historical alerts, application logs, system logs, data protection operations, and/or data management operations. In one or more embodiments, the aforementioned data may be stored as "data protection/management operation metadata" in the service request pattern database (114), in which the corresponding data may be backed up in a backup medium (temporarily or permanently), or may be restored in a recovery host. Additional details about the indexing service are described above.

In one or more embodiments, the unstructured and/or structured data may be updated (automatically) by third party systems (e.g., platforms, marketplaces, etc.) (provided by the vendor) or by administrators based on, for example, newer (e.g., updated) versions of metadata, fixes, recommendations, application upgrades, and/or SLAs being available. The unstructured and/or structured data may also be updated when, for example (but not limited to): a different type of alert is triggered (in a data protection module), a different type of system log is generated (in a data protection module), a newer version of an existing KB article is published, a support ticket (e.g., a reported incident) is resolved, a comment is received for a support ticket, a TSI is resolved by a provided recommendation, a TS request is not resolved by a provided recommendation, etc.

In one or more embodiments, the unstructured and/or structured data may be maintained by, for example, the Analysis server (112). The analysis server (112) may add, remove, and/or modify those data in the service request pattern database (114) to cause the information included in the service request pattern database (114) to reflect the latest version of, for example, metadata. The unstructured and/or structured data available in the service request pattern database (114) may be implemented using, for example, lists, tables, unstructured data, structured data, etc. While described as being stored locally, the unstructured and/or structured data may be stored remotely, and may be distributed across any number of devices without departing from the scope of the invention.

In one or more embodiments, the service request pattern database (114) may be an example of a solution service. As discussed above, the solution service may be implemented as a support database; however, the solution service may also be implemented as any other computing device (e.g., 500, FIG. 5) (or a set of computing devices) that stores the aforementioned unstructured and/or structured data and perform the functionality of the solution service described throughout this application.

In one or more embodiments, the service request pattern database (114) may include an agent (not shown). The agent may be configured to: (i) generate a solution tree, (ii) analyze unstructured and/or structured data, and (iii) store them into the Service request pattern database (114). Further, based on a context-aware search performed in the Service request pattern database (114), the agent may provide an exact or the most relevant (e.g., suitable) solution/recommendation, for example, for an alert (e.g., an increased resource-related change has occurred in Data Protection Module 45, a decreased resource-related change has occurred in Data Protection Module 42, etc.) received from the secured interface (128) or a hardware component failure reported by the secured interface (128). In one or more embodiments, the agent may be implemented using hardware, software, or any combination thereof.

In one or more embodiments, the agent of the service request pattern database (114) may receive various TS history related inputs (e.g., TS history details of data protection modules) from the Analysis server (112) and/or from a TS session. Upon receiving, the agent may analyze those inputs to generate an index(es) (e.g., a TS session index(es)) for historical TS sessions included in the inputs, in which the index(es) may include, for example (but not limited to): information about a user associated with a historical TS session, a keyword extracted from a historical TS session that relate to a TSI, a TSI tag (i.e., a keyword that identify a TSI issue that was a subject of a TS session) provided by the secured interface (128), etc. The index(es) may also include other information that may be used to efficiently identify the historical TS sessions. In one or more embodiments, the aforementioned data may be stored as "TS session metadata" in the service request pattern database (114) with the corresponding TS sessions.

While the service request pattern database (114) has been illustrated and described as including a limited number and type of data, the service request pattern database (114) may store additional, less, and/or different data without departing from the scope of the invention. One of ordinary skill will appreciate that the Service request pattern database (114) may perform other functionalities without departing from the scope of the invention. When providing its functionalities, the service request pattern database (114) may perform all, or a portion, of the methods illustrated in FIGS. 3.1 and 3.2. The service request pattern database (114) may be implemented using hardware, software, or any combination thereof.

In one or more embodiments, the network may represent a computing network configured for computing resource and/or messages exchange among registered computing devices (e.g., the secured interface (128), the analysis server (112), etc.). As discussed above, components of the system (100) may operatively connect to one another through the network (e.g., a LAN, a WAN, a mobile network, a wireless LAN (WLAN), etc.). In one or more embodiments, the network may be implemented using any combination of wired and/or wireless network topologies, and the network may be operably connected to the Internet or other networks. Further, the network may enable interactions between, for example, the secured interface (128) and the Analysis server (112) through any number and type of wired and/or wireless network protocols (e.g., TCP, UDP, Internet Protocol version 4 (IPv4), etc.). Further, the network may be configured to perform all, or a portion, of the functionality described in FIGS. 3.1 and 3.2.

The network may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components (e.g., a network device) in the network, and (iii) limiting communication(s) on a granular level (e.g., on a per-port level, on a per-sending device level, etc.).

In one or more embodiments, before communicating data over the network, the data may first be broken into smaller batches (e.g., data packets) so that larger size data can be communicated efficiently. For this reason, the network-enabled subcomponents may break data into data packets. The network-enabled subcomponents may then route each data packet in the network to distribute network traffic uniformly. In one or more embodiments, the network-enabled subcomponents may decide how real-time (e.g., on the order of milliseconds or less) network traffic and non-real-time network traffic should be managed in the network. In one or more embodiments, the real-time network traffic may be high priority (e.g., urgent, immediate, etc.) network traffic. For this reason, data packets of the real-time network traffic may need to be prioritized in the network. The real-time network traffic may include data packets related to, for example (but not limited to): videoconferencing, web browsing, voice over Internet Protocol (VOIP), etc.

In one or more embodiments, the non-real-time network traffic may be low priority (e.g., non-urgent) network traffic. For this reason, data packets of the non-real-time network traffic may not need to be prioritized in the network. The non-real-time network traffic may include data packets related to, for example (but not limited to): File Transfer Protocol (FTP) for web publishing, email applications, etc.

Figure 2:
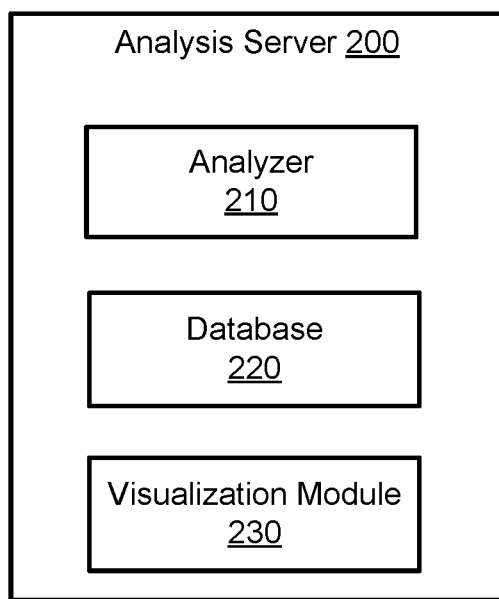
FIG. 2 shows a diagram of an analysis server in accordance with one or more embodiments of the invention.

Turning now to FIG. 2. FIG. 2 shows a diagram of an analysis server (200) in accordance with one or more embodiments of the invention. The analysis server (200) may be an example of the analysis server discussed above in reference to FIG. 1. The analysis server (200) may include an analyzer (210), a database (220), and a visualization module (230). The analysis server (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the analyzer (210) may include functionality to, e.g.: (i) monitor performance of a data protection module by obtaining/collecting (or receiving) metadata (described below) associated with a data protection module, (ii) analyze (or process), (a) by employing a set of linear, non-linear, and/or machine learning (ML) models and (b) based on a set of defined policies/parameters (e.g., an increased resource (e.g., a search node, a proxy node, a reporting node, a NAS node, an input/output (I/O) stream count associated with a data protection policy, etc.) related change has occurred in Data Protection Module B→report (or take action with regard to) this log to the VE analyzer (e.g., 112, FIG. 1), a decreased resource-related change has occurred in Data Protection Module C→report this log to the VE analyzer (e.g., 112, FIG. 1), etc.), obtained (or received) metadata to extract relevant data, (iii) based on (ii), infer (a) previous and current states of the corresponding data protection module and (b) one or more events that have occurred in that data protection module, (iv) based on (iii), infer a future state of the corresponding data protection module (to build observability for the data protection module in order to identify health of the data protection module), (v) based on (iii), make a determination that a resource-related change has occurred in the data protection module (for example, to further identify health of the corresponding data protection module), (vi) based on (v), make a determination that an increased resource-related change has occurred in the data protection module, (vii) based on (vi), automatically react and send the relevant data to the VE analyzer (e.g., 112, FIG. 1) over the network (described above in reference to FIG. 1), (viii) based on (vii), receive, over the network, a recommendation (that is generated by the VE analyzer (e.g., 112, FIG. 1) for the user of the corresponding data protection module) to manage the increased resource-related change in the data protection module, (ix) provide the recommendation (received in (viii)) to a corresponding client to notify the user of that client about the recommendation using a GUI of that client. (x) after sending the recommendation to the user and by continuing monitoring of the data protection module, make a determination that the data protection is not configured by the user based on the recommendation, (xi) based on the determination made in (x), resend the first recommendation to the user using the GUI of the client, (xii) based on (v), make a determination that a decreased resource-related change has occurred in the data protection module, (xiii) based on (xii), automatically react and send the relevant data to the VE analyzer (e.g., 112, FIG. 1) over the network, (xiv) based on (xiii), receive, over the network, a recommendation (that is generated by the VE analyzer (e.g., 112, FIG. 1) for the user of the corresponding data protection module) to manage the decreased resource-related change in the data protection module, (xv) provide the recommendation (received in (xiv)) to a corresponding client to notify the user of that client about the recommendation using a GUI of that client, (xvi) after sending the recommendation to the user and by continuing monitoring of the data protection module, make a determination that the data protection is not configured by the user based on the recommendation, (xvii) based on the determination, resend the recommendation to the user using the GUI of the client, and (xviii) store the above-discussed data and/or the output(s) of the above-discussed processes in the database (220). Additional details of the analyzer are described below in reference to FIGS. 3.1-3.2.

With respect to the aforementioned resources, for example, consider a scenario in which a data protection module orchestrates protection of a VM that contains 1000 files (e.g., File A, File B, File C, etc.). At some point in time, a user of the data protection module accidentally deletes File B and wants to restore File B from the corresponding data domain. For this reason, the user sends a request to the data protection module. Based on the request, using its search node, the data protection module finds and automatically restores File B (without restoring the entire VM) for the user.

As used herein, a "proxy node" is an intermediate computing device that is located between a server and a data domain target, where the proxy node acts as a data mover.

As used herein, a "reporting node" generates a report including, for example (but not limited to): details of data that has been protected over the last twelve hours, how many data protection jobs are still active, how many data protection jobs are completed, how many data protection jobs are failed, etc. Thereafter, the reporting node may provide the report to the analyzer (210) and/or an administrator of the corresponding data protection module.

As used herein, a "NAS node" is an intermediate computing device that is located between a NAS server (e.g., NetApp® NAS server) and a data domain target, where the NAS node acts as a data mover (similar to a proxy node).

In one or more embodiments, in order to obtain (or receive) metadata or to determine whether or not a provided recommendation is applied by a user of the corresponding data protection module, the analyzer (210) may monitor the data protection modules (e.g., 125, FIG. 1). While monitoring, the analyzer (210) may need to, for example (but not limited to): inventory one or more components of each data protection module, obtain a type and a model of a component of a data protection module, obtain a version of firmware or other code executing on a data protection module, obtain information regarding a hardware component or a software component of a data protection module, obtain information specifying each module's interaction with another component of the system (e.g., 100, FIG. 1), etc.

In one or more embodiments, if the models that are used by the analyzer (210) are not operating properly (e.g., are not providing the above-discussed functionalities), the models may be re-trained using any form of training data and/or the models may be updated periodically as there are improvements in the models (e.g., the models are trained using more appropriate training data).

In one or more embodiments, the analyzer (210) may include any logic, business rule, function, and/or operation for optimizing, accelerating, or otherwise improving the performance, operation, and/or quality of service of outgoing network traffic or the delivery of data packets (including, for example, metadata) over the network. In this manner, the analyzer (210) may (a) regulate data transfer rates and data receipt rates in conjunction with a network device (not shown), (b) coordinate with the network device to manipulate, adjust, simulate, change, improve, or otherwise adapt the behavior of a predetermined data transfer protocol to improve performance of delivery, data rates, and/or communication bandwidth utilization of the network, (c) implement (in conjunction with the network device) a data transfer/flow control method, for example (but not limited to): a pre-acknowledgement method, a window virtualization method, a re-congestion method, a local re-transmission method, a transaction boundary detection method, a re-packetization method, etc., and (d) measure and monitor the performance of any acceleration technique performed by the network device, such as SSL offloading, load balancing and/or content switching, connection pooling and multiplexing, caching, and compression.

One of ordinary skill will appreciate that the analyzer (210) may perform other functionalities without departing from the scope of the invention. When providing its functionalities, the analyzer (210) may perform all, or a portion, of the methods illustrated in FIGS. 3.1-3.2. The analyzer (210) may be implemented using hardware, software, or any combination thereof.

In one or more embodiments, the database (220) may be a fully managed, local, and lightweight database (or any logical container) that acts as a shared storage or memory resource (discussed above in reference to FIG. 1) that is functional to store unstructured and/or structured data. Further, the database (220) may also occupy a portion of a physical storage/memory device or, alternatively, may span across multiple physical storage/memory devices.

In one or more embodiments, the database (220) may be implemented using physical devices that provide data storage services. The devices that provide data storage services may include hardware devices and/or logical devices. For example, the database (220) may include any quantity and/or combination of memory devices, long-term storage devices, other types of hardware devices that may provide short-term and/or long-term data storage services, and/or logical storage devices.

For example, the database (220) may include a memory device (e.g., a dual in-line memory device), in which data is stored and from which copies of previously stored data are provided. As yet another example, the database (220) may include a persistent storage device (e.g., an SSD), in which data is stored and from which copies of previously stored data is provided. As yet another example, the database (220) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (220) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (220) may store/log/record (temporarily or permanently) unstructured and/or structured data that may include (or specify), for example (but not limited to): one or more policies/rules for the operation (or configuration) of any portion of the analyzer (210) (to manage functions/operations performed by the analyzer (210)), details of each data protection module (e.g., how many search nodes deployed to each data protection module, information regarding the criticality of a data protection operation orchestrated by a data protection module, an IP address of each component deployed to a data protection module, active/passive port numbers of each component deployed to a data protection module, a product identifier of each component deployed to a data protection module, applications/software executing on a data protection module, etc.) deployed to the CE (e.g., 120, FIG. 1), a device profile of a healthy data protection module, a device profile of an unhealthy data protection module, one or more outputs of the processes performed by the analyzer (210), a set of SLAs (e.g., an agreement that indicates a period of time required to retain a profile of a user, an agreement that indicates a period of time required to retain a device profile of a data protection module, etc.), recently obtained user information of a user of a data protection module, a model name of a hardware component, metadata (application logs, system logs, alerts, etc., associated with a data protection module) received from the analyzer (210), data protection module specific information (e.g., data protection module events, periodically obtained temperature data/logs of a data protection module, periodically obtained sensor data/logs of a data protection module, etc.), other types of information indicative of health of a data protection module, one or more details of an alert, one or more details of an application log, one or more details of a system log, any changes to alerts and/or logs (as well as the relevant parties and information associated with such changes, in which the changes may be result of changes made by an administrator or via administrative systems), etc.

In one or more embodiments, as telemetry data, application logs may include (or specify), for example (but not limited to): application metadata (to determine properties of an application executing on a data protection module), a size of an application (a size (e.g., 5 Megabytes (5 MB), 5 Gigabytes (5 GB), etc.) of an application may specify how much storage space is being consumed by that application), a type of an application (a type of an application may specify that, for example, the application is a support, deployment, or recycling application), a priority of an application (described below), a setting of a mission critical application (described below) executing on a data protection module, a warning/an error (e.g., unknown software exception (0xc00d) occurred in the application at location 0x0007d) occurred in an application, a version of an application, a version of an OS, a display resolution configuration of a client, a type of an OS (e.g., a workstation OS), an identifier of an OS (e.g., Microsoft® Windows), a product identifier of an application, active and inactive session counts, etc.

In one or more embodiments, a "setting of an application" may refer to a current setting that is being applied to an application either by a user or by default. A setting of an application may include, for example (but not limited to): a display option (e.g., a two-sided view) that is selected by a user, a font option that is selected by a user, an inbox folder setting of an electronic mail exchange application, a microphone setting of an application, a background setting of an application, etc.

In most cases, obtaining one or more settings of an application may be important, for example, for the VE analyzer (e.g., 112, FIG. 1) while searching for a proper solution (e.g., a proper recommendation) (for a reported TSI such as a "decreased resource-related change" alert associated with a data protection module) in the VE database (e.g., 114, FIG. 1). For example, consider a scenario where the number of search nodes needs to be reduced in Data Protection Module F (as a solution to a "decreased resource-related change" alert reported by the analysis server (e.g., 128, FIG. 1)). In order to find a suitable (e.g., a compliant) recommendation (e.g., reducing the number of search nodes from 100 to 75) for the reported alert in the VE database (e.g., 114, FIG. 1), the agent of the VE database (e.g., 114, FIG. 1) may need to know application settings of applications executing on Data Protection Module F. Otherwise, a non-compliant recommendation may be sent to the analysis server (e.g., 128, FIG. 1), which may affect production workloads of Data Protection Module F (when applied by the user of Data Protection Module F).

In one or more embodiments, a "priority of an application" may specify, for example, a priority class of that application. The priority class may be based on, for example (but not limited to): an application's tolerance for downtime, a size of an application, a relationship (e.g., a dependency) of an application to other applications, etc. In one or more embodiments, applications may be classified based on each application's tolerance for downtime. For example, based on the classification, an application may be assigned to one of three classes such as Class I, Class II, and Class III. Class I application may be an application that cannot tolerate downtime. Class II application may be an application that can tolerate a period of downtime (e.g., an hour or other period of time determined by an administrator or a user). Class III application may be an application that can tolerate any amount of downtime.

In one or more embodiments, as telemetry data, system logs (including event logs and important keywords) may specify (or include), for example (but not limited to): a type of an asset (e.g., a type of a workload, such as an SQL database, a NAS executing on-premises, a VM executing on a multi-cloud infrastructure, etc.) utilized by a user, an SLA/SLO set by a user, an identifier of a client, a type of a client, information related to a data protection module's CPU usage, information related to a newly detected USB device, a data protection module's system state (e.g., health state information of a data protection module) (for example, health state information of a data protection module may indicate whether, based on the aggregated health information, the data protection module is or is not in a compromised health state (described below)), a transition from one data protection module state to another data protection module state (e.g., fan failure→overheating of the data protection module's CPU, fan failure→data protection module's memory module failure, etc.), an important keyword related to a data protection module (e.g., for Data Protection Module B, the recommended maximum CPU operating temperature threshold is 45° C.), an amount of storage or memory (e.g., stack memory, heap memory, cache memory, etc.) used by an application, a language setting of an OS, a serial number of a data protection module, a hardware ID number of a data protection module, an identifier of a data protection module's manufacturer, a media access control (MAC) information of a data protection module, a network connectivity information (e.g., a category of a network) of a data protection module, a type of a data protection module, a type of a file system (e.g., a new technology file system (NTFS), a resilient file system (ReFS), etc.), a certain file operation performed by a data protection module, an amount of networking resource utilized by a data protection module to perform a network operation (e.g., to publish and coordinate inter-process communications), an amount of bare metal communication executed by a data protection module (e.g., input/output (I/O) operations executed by a data protection module per second), a quantity of file descriptors (e.g., an unsigned integer that identifies an open file in an OS) utilized by a process that is executed by a data protection module, a quantity of threads (e.g., a term indicating the quantity of operations that may be handled by a processor at once) utilized by a process that is executed by a data protection module, operation errors detected for a data protection module while orchestrating a data protection operation, computing resource utilization data (or key performance metrics including estimates, measurements, etc.) regarding the resources (e.g., product features) of a data protection module, a job detail (e.g., how many data protection policies execute at the same time in a data protection module; based on a configured data protection policy, how many assets are being backed up by the production host (e.g., 124, FIG. 1); a type of a job, such as a data protection job, a data restoration job, a log retention job, etc.), a workflow (e.g., a policy that dictates how a workload should be configured and/or protected, such as an SQL workflow dictates how an SQL workload should be protected) set (by a user) for a data protection module, network latency information related to a data protection module, bandwidth utilization information of a data protection module, a data protection policy implemented by a user of a data protection module, a configuration setting of that policy, a product configuration information associated with a data protection module, a number of each type of a set of assets protected by a data protection module, a size of each of the set of assets protected, a number of each type of a set of data protection policies implemented by a user, a deployment configuration (e.g., a multi virtual local area network (VLAN) configuration, an IPv6 configuration, etc.) set (by a user) for a data protection module, a deployment environment/OS (e.g., a VMware® Cloud (VMC) environment, a Microsoft® Windows OS, a Microsoft® Hyper-V environment, etc.) set (by a user) for a data protection module, heuristic patterns with respect to a data protection policy (e.g., for Assets A-C: a data protection operation is completed (based on Policy Y) within two hours on Day 1, the same data protection operation is completed within two hours on Day 2; however, the same data protection operation is completed within three hours on Day 3) and reasons (e.g., a resource contention, a number of resources available in the corresponding data protection module, etc.) of the heuristic patterns, a number of each type of a resource deployed to a data protection module, a number of each type of a resource configured (e.g., calibrated) by a user of in the corresponding data protection module, details (information related to, for example, maximum throughput, logical capacity, usable capacity, usable capacity with cloud tier, I/O stream count, etc.) of a data domain where one or more assets are stored/protected, a number of data protection policies that are concurrently executing on a data protection module (which provides total I/O stream count information associated with that data protection module), etc.

In one or more embodiments, a compromised health state (e.g., an unhealthy state) may indicate that the corresponding data protection module has already or is likely to, in the future, be no longer able to provide the computing resources (or services) that it has previously provided. The health state determination may be made via any method based on the aggregated health information without departing from the scope of the invention.

In one or more embodiments, important keywords may be defined by a vendor of that data protection module, by the administrator of that data protection module, by another entity, or any combination thereof. The important keywords may be specific technical terms or vendor specific terms that are used in system log files.

In one or more embodiments, as telemetry data, an alert (e.g., a predictive alert, a proactive alert, a technical alert, a critical alert, a warning alert, etc.) may specify (or include), for example (but not limited to): an increased resource-related change has occurred in Data Protection Module 45, a decreased resource-related change has occurred in Data Protection Module 42, etc. In one or more embodiments, alerts may be defined by the vendor of the data protection modules (e.g., 125, FIG. 1), by the administrator of the data protection modules (e.g., 125, FIG. 1), by another entity, or any combination thereof. The alerts may be defined based on a data management policy.

In one or more embodiments, a product feature (or a resource) may be, for example (but not limited to): a centralized protection policy (e.g., a main/central server that orchestrates a data protection policy for one or more servers), a self-service protection policy (e.g., individual servers orchestrate their own data protection policies), a centralized restore policy (e.g., performing a restoration operation from a central server), a self-service restore policy (e.g., individual servers perform their own data restoration operations), a cloud tiering policy, a replication policy, a rapid recovery policy (e.g., replicating entire data (along with corresponding metadata) from a first data center to a second data center when the first data center goes off for a cause, and then bringing the first data center alive at the second data center using the aforementioned data), a DR policy (e.g., replicating data (along with computer processing) to a location not affected by a disaster (e.g., a natural disaster, a cyber-attack, etc.) in order to regain access and functionality to the IT infrastructure), a cloud DR policy, a search node, a proxy node, a reporting node, a NAS node, an I/O stream count associated with a data protection policy, etc.

In one or more embodiments, a data protection policy may include (or specify), for example (but not limited to): an RPO with copies of data to be generated at a specific interval, an RTO with mission critical applications restored with low latency storage, performance requirements (e.g., latency requirements, streaming requirements, priority requirements, etc.) need to be followed while backing up data, cost associated to protect data (e.g., cloud cost versus on-premise cost), information regarding to a product feature (e.g., a centralized protection policy may be configured to protect a VM, in which the VM provides computer-implemented services to a user), etc.

In one or more embodiments, similar to the CE database (e.g., 126, FIG. 1), the database (220) may provide an indexing service. An index may include, for example (but not limited to): information about a user associated with a data protection operation, a keyword extracted from a data recovery operation that relates to a type of the recovery, an alert associated with a data protection operation, etc. The index(es) may also include other information that may be used to efficiently identify historical alerts, application logs, system logs, data protection operations, and/or data management operations. In one or more embodiments, the aforementioned data may be stored as "data protection/management operation metadata" in the database (220), in which the corresponding data may be backed up in a data domain (e.g., the CE storage) (temporarily or permanently), or may be restored in a recovery host. Additional details about the indexing service are described above in reference to FIG. 1.

In one or more embodiments, the unstructured and/or structured data may be updated (automatically) by third party systems (e.g., platforms, marketplaces, etc.) (provided by the vendor) or by administrators based on, for example, newer (e.g., updated) versions of alerts, application logs, system logs, and/or SLAs being available. The unstructured and/or structured data may also be updated when, for example (but not limited to): a different type of cause triggers an alert, a different type of cause triggers a system log, a different type of cause triggers an application log, etc.

In one or more embodiments, the unstructured and/or structured data may be maintained by, for example, the analyzer (210). The analyzer (210) may add, remove, and/or modify those data in the database (220) to cause the information included in the database (220) to reflect the latest version of, for example, alerts, application logs, system logs, and/or data protection component details. The unstructured and/or structured data available in the database (220) may be implemented using, for example, lists, tables, unstructured data, structured data, etc. While described as being stored locally, the unstructured and/or structured data may be stored remotely, and may be distributed across any number of devices without departing from the scope of the invention.

While the database (220) has been illustrated and described as including a limited number and type of data, the database (220) may store additional, less, and/or different data without departing from the scope of the invention.

One of ordinary skill will appreciate that the database (220) may perform other functionalities without departing from the scope of the invention. When providing its functionalities, the database (220) may perform all, or a portion, of the methods illustrated in FIGS. 3.1-3.2. The database (220) may be implemented using hardware, software, or any combination thereof.

In one or more embodiments, the visualization module (230) may include functionality to, e.g.: (i) receive relevant data and display the aforementioned content on its GUI (for example, to an administrator of the data protection modules (e.g., 125, FIG. 1)) and (ii) receive a device profile (e.g., healthy, unhealthy, etc.) of a data protection module and display the aforementioned content on its GUI (for example, in a separate window(s) on its GUI). In one or more embodiments, the visualization module (230) may concurrently display one or more separate windows on its GUI.

In one or more embodiments, for example, while displaying a device profile of a data protection module, the visualization module (230) may represent: (i) the device profile of a healthy data protection module with green color tones and (ii) the device profile of an unhealthy data protection module with red color tones.

One of ordinary skill will appreciate that the visualization module (230) may perform other functionalities without departing from the scope of the invention. Although the visualization module (230) is shown as part of the analysis server (200), the visualization module (230) may be implemented separately in the form of hardware, software, or any combination thereof.

In one or more embodiments, the analyzer (210), the database (220), and the visualization module (230) may be utilized in isolation and/or in combination to provide the above-discussed functionalities. These functionalities may be invoked using any communication model including, for example, message passing, state sharing, memory sharing, etc. By doing so, the analysis server (200) may address issues related to data security, integrity, and availability proactively.

FIGS. 3.1-3.2 show a method for reconfiguring a data protection module based on metadata in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed analyzer (e.g., 210, FIG. 2). Other components of the system (100) illustrated in FIG. 1 may also execute all or part of the method shown in FIG. 3.1 without departing from the scope of the invention.

In Step 300, a notification is received for an auto-generated service request associated with a client environment issue. In one or more embodiments, the service request is generated by a service request manager that parses any telemetry information to collect alerts associated with the client environment. The alerts are classified based on a criticality of the alerts (e.g., critical, medium, warning), and further based on a tolerance level specified in the alerts (e.g., an entry of the alerts), and generate a service request if an entry meets a criticality and tolerance requirement. For example, a service request may be generated if the criticality is "critical" and the tolerance level is above a threshold value. The service request may be provided to the analyzer via the secured interface for further analysis.

In Step 302, metadata associated with the auto-generated service request is obtained. In one or more embodiments, upon receiving the service request, the analyzer obtains/gathers (or receives) telemetry metadata (e.g., application logs, system logs, data protection module related events, alerts, etc.) that are associated with the service request. In one or more embodiments, the obtained metadata may specify (or include), for example (but not limited to): application metadata (to determine properties of an application executing on a data protection module), an amount of networking resource utilized by a data protection module (or other entity in the client environment) to perform a network operation, a type of a workload utilized by a user, a data protection policy implemented by a user, etc. In one or more embodiments, metadata may indicate at least one state transition of the data protection module, in which, for example, the state transition (from a healthy state to an unhealthy state) of the data protection module may specify: operational Data Protection Module H→ the number of protected assets are increased in Data Protection Module H→ Data Protection Module H fan failure→ overheating of Data Protection Module H's CPU→ inability to perform asset discovery.

Further, for example, (i) based on a failed cloud DR operation (which is initiated by a user), the corresponding data protection module may generate a failure alert; (ii) based on an increased resource-related change (which is performed by a user), the corresponding data protection module may generate a critical alert, and/or (iii) based on a decreased resource-related change (which is performed by a user), the corresponding data protection module may generate a critical alert. Additional details of the metadata are described above in reference to FIG. 2.

In one or more embodiments, the metadata may be obtained (e.g., may be dynamically fetched) as they become available (e.g., with no user manual intervention), or by the analyzer polling the data protection module (by making schedule-driven/periodic API calls to the data protection module without affecting its ongoing production workloads) for newer metadata. Based on receiving the API calls from the analyzer, the data protection module may allow the analyzer to obtain the metadata.

The metadata may be obtained (or streamed) continuously as they are generated, or they may be obtained in batches, for example, in scenarios where (i) the analyzer receives metadata analysis request, (ii) the data protection module accumulates the information and provides them to the analyzer at fixed time intervals, or (iii) the data protection module stores the information in its database (or in an external entity), and notifies the analyzer to access the information from its database or the external entity. In one or more embodiments, the information may be access-protected for transmission from the data protection module to the analyzer, e.g., using encryption.

In one or more embodiments, before analyzing the obtained metadata (in Step 302), the analyzer may store (temporarily or permanently) them in the database (e.g., 220, FIG. 2), where the metadata contains a lot of potential to generate various insights that would help to prevent catastrophic events that may occur in the data protection module (by proactively addressing them). In this manner, the analyzer may obtain more information regarding, e.g., (i) the operations performed and/or failures occurred in the corresponding data protection module, and (ii) one or more reasons of those failures (e.g., is it because the production host (e.g., 124, FIG. 1) not accessible, is it because the CE database (e.g., 126, FIG. 1) not accessible, etc.).

In Step 304, the metadata is analyzed to extract pattern information. In one or more embodiments, based on the obtained metadata, the pattern information is generated. For example, the pattern information may specify a cause of the issue associated with the service request. The cause may be determined by analyzing the state of multiple data protection modules (or other entities) that may have caused the issue to arise. For example, if the service request specifies a failure by a data protection module to discover copies of a protected asset, the pattern information may specify the number of assets to be discovered, the number of data protection modules, a data protection policy, the state of an agent service availability during a given period of time, etc.

In Step 306, the pattern information is compared to a service request pattern database. In one or more embodiments, the pattern information is compared to determine whether identical (or substantially similar) pattern information is specified in the service request pattern database. The pattern information specified in the service request pattern database that is identical (or substantially similar) to the extracted pattern information may be mapped to a recommendation.

In Step 308, a determination is made about whether a recommendation is associated with the pattern information. If a recommendation is associated with the pattern information, the method proceeds to Step 312; otherwise, the method proceeds to Step 310.

In Step 310, after the determination that the pattern information is not associated with a recommendation, the service request is provided to an administrator for service request resolution. In one or more embodiments of the invention, the service request is resolved by the administrator.

In Step 312, the recommendation is sent to the user using the update notification. In one or more embodiments, the recommendation for resolving the service request is sent to the user via the update notification. In one or more embodiments, the update notification specifies updating the software of one or more components in the client environment. The update notification may be accepted by the user for performing the update. Further, the user may accept the recommendation via the update notification. Based on the acceptance, the recommendation may be performed. In this manner, the service request resolution is the result of performing the recommendation.

In Step 314, the service request pattern database is updated based on the result of service request resolution. In one or more embodiments, the resolution performed by the administrator following Step 310 or the service request resolution performed in Step 312 may be provided to the service request pattern database for logging. Specifically, the pattern information extracted in Step 304 is mapped to the resolution (performed either by the analyzer or by the administrator). In this manner, for future service request with similar pattern information may be mapped to the resolution to be performed without the required use of the administrator.

Turning now to FIG. 3.2, the method shown in FIG. 3.2 may be executed by, for example, the above-discussed analyzer. Other components of the system (100) illustrated in FIG. 1 may also execute all or part of the method shown in FIG. 3.2 without departing from the scope of the invention.

In Step 320, a notification is received for an auto-generated service request associated with a re-configuration of nodes. In one or more embodiments, the service request is generated by a service request manager that parses any telemetry information to collect alerts associated with the client environment. The alerts are classified based on a criticality of the alerts (e.g., critical, medium, warning), and further based on a tolerance level specified in the alerts (e.g., an entry of the alerts), and generate a service request if an entry meets a criticality and tolerance requirement. For example, a service request may be generated if the criticality is "critical" and the tolerance level is above a threshold value. The service request may be provided to the analyzer via the secured interface for further analysis.

In Step 322, metadata associated with the auto-generated service request is obtained. In one or more embodiments, similar to Step 302, upon receiving the service request, the analyzer obtains/gathers (or receives) telemetry metadata (e.g., application logs, system logs, data protection module related events, alerts, etc.) that are associated with the service request. In one or more embodiments, the obtained metadata may specify (or include), for example (but not limited to): application metadata (to determine properties of an application executing on a data protection module), an amount of networking resource utilized by a data protection module (or other entity in the client environment) to perform a network operation, a type of a workload utilized by a user, a data protection policy implemented by a user, etc. In one or more embodiments, metadata may indicate at least one state transition of the data protection module, in which, for example, the state transition (from a healthy state to an unhealthy state) of the data protection module may specify: operational Data Protection Module H→ the number of protected assets are increased in Data Protection Module H→ Data Protection Module H fan failure→ overheating of Data Protection Module H's CPU→ inability to perform asset discovery.

Further, for example, (i) based on a failed cloud DR operation (which is initiated by a user), the corresponding data protection module may generate a failure alert; (ii) based on an increased resource-related change such as an increase in the number of data protection modules operating in the client environment, and/or (iii) based on a decreased resource-related change (which is performed by a user). Additional details of the metadata are described above in reference to FIG. 2.

In one or more embodiments, the metadata is associated with the data protection modules. For example, the metadata may specify identifiers of each data protection modules, the types of nodes (e.g., proxy nodes, reporting nodes, etc.) operating on the data protection modules, and/or any other information associated with the data protection modules.

In one or more embodiments, the metadata may be obtained (e.g., may be dynamically fetched) as they become available (e.g., with no user manual intervention), or by the analyzer polling the data protection module (by making schedule-driven/periodic API calls to the data protection module without affecting its ongoing production workloads) for newer metadata. Based on receiving the API calls from the analyzer, the data protection module may allow the analyzer to obtain the metadata.

The metadata may be obtained (or streamed) continuously as they are generated, or they may be obtained in batches, for example, in scenarios where (i) the analyzer receives metadata analysis request, (ii) the data protection module accumulates the information and provides them to the analyzer at fixed time intervals, or (iii) the data protection module stores the information in its database (or in an external entity), and notifies the analyzer to access the information from its database or the external entity. In one or more embodiments, the information may be access-protected for transmission from the data protection module to the analyzer, e.g., using encryption.

In one or more embodiments, before analyzing the obtained metadata (in Step 322), the analyzer may store (temporarily or permanently) them in the database (e.g., 220, FIG. 2), where the metadata contains a lot of potential to generate various insights that would help to prevent catastrophic events that may occur in the data protection module (by proactively addressing them). In this manner, the analyzer may obtain more information regarding, e.g., (i) the operations performed and/or failures occurred in the corresponding data protection module, and (ii) one or more reasons of those failures (e.g., caused by the production host (e.g., 124, FIG. 1) not being accessible, caused by the CE database (e.g., 126, FIG. 1) not being accessible, etc.).

In Step 324, the metadata is analyzed to extract current node configuration details. In one or more embodiments, based on the obtained metadata, the current node configuration details specifies the number (or quantity) of data protection modules operating on the client environment, a number of proxy nodes and reporting nodes (or other nodes) executing on the data protection modules, and the data protection policy implemented by the data protection modules. The current node configuration details may specify other information without departing from the invention.

In Step 326, the current node configuration details are compared to a determined optimized configuration. In one or more embodiments, the optimized configuration is determined based on a node optimization model. The node optimization model may be a data structure specified in the CE database that relates a data protection policy to an optimal node configuration (e.g., an optimal number of data protection modules, optimal number of proxy nodes, and optimal number of reporting nodes). For example, for a given set of assets to be protected, based on the size of the assets, the number of files in each asset, and a schedule (e.g., a frequency) for backing up the assets, an optimal number of proxy nodes for performing the backups is determined that maximizes efficiency and minimizes resource use. The current node configuration details may be input to the node optimization model and compared to the determined optimized configuration.

In Step 328, a determination is made about whether an optimization is required. The optimization may include adding, removing, or otherwise re-configuring (also referred to as re-scaling) the number of data protection modules, proxy nodes, reporting nodes, or other nodes in the client environment. If an optimization is required, the method proceeds to Step 332; otherwise, the method proceeds to Step 330.

In Step 330, after the determination that an optimization is not required, a notification of current node configuration being in an optimized state is sent to a user.

In Step 332, the recommendation is sent to the user using the update notification. In one or more embodiments, the recommendation for resolving the service request is sent to the user via the update notification. In one or more embodiments, the update notification specifies updating the software of one or more components in the client environment. Further, the update notification specifies optimizing the node configuration by adding, removing, or otherwise reconfiguring the nodes in the client environment. The update notification may be accepted by the user for performing the update. Further, the user may accept the recommendation via the update notification. Based on the acceptance, the recommendation may be performed. In this manner, the service request resolution is the result of performing the recommendation.

In Step 334, the node configuration is updated based on the result of the service request resolution. In one or more embodiments, the analyzer initiates a re-configuration of the nodes in the client environment in accordance with the determined optimized configuration. This may include increasing or decreasing the number of data protection modules, the number of proxy nodes, the number of reporting nodes, or the number of any other type of node in the client environment.

To further clarify embodiments of the invention, a non-limiting example use case is provided in FIGS. 4.1-4.3.

Start of Example

The example use case, illustrated in FIGS. 4.1-4.3, is not intended to limit the scope of the embodiments disclosed herein and is independent from any other examples discussed in this application.

Turning to the example, consider a use case in which an example system obtains telemetry data and uses the telemetry data to generate service requests to be processed. FIGS. 4.1-4.3 show an example system in accordance with one or more embodiments of the invention. The example system includes a client environment (420) and a vendor environment (410). Components of the example system may perform actions and/or transmit data in this use case. Such actions may be illustrated in FIGS. 4.1-4.3 using numbered circles and described below using bracketed numbers (e.g., "[1]").

A production host (424) of the client environment generates alerts telemetry data (430) associated with events occurring in the production host (424). The alerts telemetry data (430) is obtained by a service request manager (400) of the client environment (420) [1]. Based on the obtained telemetry data, the service request manager (432) parses the entries in the alerts to classify the alerts based on their criticality and their tolerance threshold value. One alert has a "critical" category and a 0.7 tolerance level. These parameters meet the criteria for an auto-generated service request to be generated. The service request specifies resolving a network connectivity issue associated with the client environment [2]. The service request (432) is transmitted to the secured interface (428) [3]. The secured interface (428) transmits the service request (428) to an analysis server (412) of the vendor environment (410) [4].

The analysis server (412) performs the method of FIG. 3.1 and processes the service request. Specifically, the metadata associated with the service request is analyzed. The metadata includes the alert. The metadata is analyzed to generate pattern information that specifies the production host (420) as a possible cause of the network connectivity issue. The pattern information is compared to a service request pattern database (426) of the vendor environment (410). The service request pattern database specifies a mapping between the pattern information of the production host (424) causing the network connectivity issue and a recommendation for resetting the production host (424). The analysis server (412) compares the extracted pattern information to the service request pattern database (426), and determines that the recommendation is to be performed. The recommendation may be transmitted to a client (not shown in FIG. 4.1) of the client environment (420) via an update notification.

Turning to FIG. 4.2, at a later point in time, the service request manager (400) monitors the data protection modules (422) operating in the production host (424) [6]. Specifically, alerts associated with the scaling of the data protection modules (422) are transmitted to the service request manager (400). An alert specifies a low number of proxy nodes in the data protection modules (422) for performing data protection of assets. Based on the alert, the service request manager (400) generates a service request (432) [7]. The service request specifies re-scaling the number of proxy nodes in the client environment (420). The service request (432) is transmitted to the secured interface (428) [8]. The secured interface (428) transmits the service request (432) to the analysis server (412) [9].

The analysis server (412) performs the method of FIG. 3.2 to process the service request. Specifically, the analysis server (412) analyzes the current node configuration and compares the current node configuration to a node optimization model (426) to determine whether an optimization is required [10]. Based on the comparison, the analysis server (412) determines that a node optimization is to be performed. Following this determination, the vendor environment (410) communicates with a client device (450) managed by an administrator of the client environment (420). Specifically, the vendor environment (410) sends an update notification that specifies the node optimization recommendation that includes increasing the number of proxy nodes. The client device (450) via the update notification, confirms the performing of the recommendation [11].

Turning to FIG. 4.3, following the approval to perform the increase of proxy nodes, the analysis server sends a request for rescaling the data protection modules to the client environment (420) via the secured interface (428) [12]. The secured interface (428) sends a notification to the production host (424) for re-scaling the data protection modules [13]. The result is the data protection modules (452) being re-scaled to increase the number of proxy nodes for data protection.

End of Example

Turning now to FIG. 5, FIG. 5 shows a diagram of a computing device (500) in accordance with one or more embodiments of the invention.

In one or more embodiments of the invention, the computing device (500) may include one or more computer processor(s) (502), non-persistent storage (504) (e.g., volatile memory, such as RAM, cache memory), persistent storage (506) (e.g., an HDD, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input device(s) (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output device(s) (508), such as a screen (e.g., a liquid crystal display (LCD), plasma display, touchscreen, cathode ray tube (CRT) monitor, projector, or other display device), a printer, external storage, or any other output device. The output device(s) (508) may be the same or different from the input device(s) (510). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a client environment, the method comprising:
    obtaining a notification for an auto-generated service request, wherein the auto-generated service request is associated with a configuration of nodes in the client environment;
    in response to the notification:
        obtaining metadata associated with the auto-generated service request,
            wherein the metadata is associated with a plurality of data protection modules executing on the client environment;
        analyzing the metadata to extract current node configuration details,
            wherein the current node configuration details specify a quantity of data protection modules, a quantity of proxy nodes executing on the data protection modules, and a number of reporting nodes executing on the data protection modules;
        comparing the current node configuration details to a node optimization model;
        making a determination, based on the comparing, that an optimization is required; and
        based on the determination, performing a re-configuration on the nodes in the client environment.

2. The method of claim 1, wherein the re-configuration comprises adding a data protection module to the client environment.

3. The method of claim 2, wherein the re-configuration further comprises adding a proxy node to the data protection module.

4. The method of claim 1, further comprising:
    after performing the re-configuration, obtaining a second notification for a second auto-generated service request, wherein the second auto-generated service request is associated with a second configuration of nodes in the client environment;
    in response to the second notification:
        obtaining second metadata associated with the second auto-generated service request;
        analyzing the second metadata to extract new current node configuration details;

comparing the new current node configuration details to the node optimization model;

making a second determination, based on the comparing, that no optimization is required; and based on the determination, sending the auto-generated service request to an administrator of the client environment.

5. The method of claim 1, wherein the auto-generated service request is generated in response to obtained telemetry information associated with an alert generated from monitoring the client environment.

6. The method of claim 1, further comprising:

prior to performing the re-configuration, sending a request for the re-configuration to a client device of the client environment; and receiving a response from the client environment confirming the re-configuration, wherein the performing is based on the response.

7. The method of claim 6, wherein the request for the re-configuration to the client device is sent via an update notification for updating the client environment.

8. The method of claim 1, wherein performing the re-configuration comprises modifying a number of backup streams performed by a data protection module.

9. A method for managing a client environment, the method comprising:

obtaining a notification for an auto-generated service request, wherein the auto-generated service request is associated with a configuration of nodes in the client environment;

in response to the notification:

obtaining metadata associated with the auto-generated service request, wherein the metadata is associated with a plurality of data protection modules executing on the client environment;

analyzing the metadata to extract current node configuration details, wherein the current node configuration details specify a quantity of the plurality of data protection modules, a quantity of proxy nodes executing on the plurality of data protection modules, and a number of reporting nodes executing on the plurality of data protection modules;

comparing the current node configuration details to a node optimization model, wherein the node optimization model specifies at least a relationship between the quantity of the plurality of data protection modules and a data protection policy;

making a determination, based on the comparing, that an optimization is required; and based on the determination, performing a re-configuration on the nodes in the client environment.

10. The method of claim 9, wherein the re-configuration comprises adding a data protection module to the plurality of data protection modules.

11. The method of claim 10, wherein the re-configuration further comprises adding a proxy node to the data protection module.

12. The method of claim 9, further comprising:

after performing the re-configuration, obtaining a second notification for a second auto-generated service request, wherein the second auto-generated service request is associated with a second configuration of nodes in the client environment;

in response to the second notification:

obtaining second metadata associated with the second auto-generated service request;

analyzing the second metadata to extract new current node configuration details;

comparing the new current node configuration details to the node optimization model;

making a second determination, based on the comparing, that no optimization is required; and based on the determination, sending the auto-generated service request to an administrator of the client environment.

13. The method of claim 9, wherein the auto-generated service request is generated in response to obtained telemetry information associated with an alert generated from monitoring the client environment.

14. The method of claim 9, further comprising:

prior to performing the re-configuration, sending a request for the re-configuration to a client device of the client environment; and receiving a response from the client environment confirming the re-configuration, wherein the performing is based on the response.

15. The method of claim 14, wherein the request for the re-configuration to the client device is sent via an update notification for updating the client environment.

16. The method of claim 9, wherein performing the re-configuration comprises modifying a number of backup streams performed by a data protection module of the plurality of data protection modules.

* * * * *